United States Patent
Vetter

(10) Patent No.: US 10,713,809 B2
(45) Date of Patent: Jul. 14, 2020

(54) INTERACTIVE SYSTEM SETUP CONCEPT

(71) Applicant: Braun GmbH, Kronberg (DE)

(72) Inventor: Ingo Vetter, Karben (DE)

(73) Assignee: BRAUN GMBH, Kronberg (DE)

( * ) Notice: Subject to any disclaimer, the term of this patent is extended or adjusted under 35 U.S.C. 154(b) by 0 days.

(21) Appl. No.: 15/434,989

(22) Filed: Feb. 16, 2017

(65) Prior Publication Data
US 2017/0236298 A1    Aug. 17, 2017

(30) Foreign Application Priority Data

Feb. 16, 2016  (EP) .................................. 16155933

(51) Int. Cl.
*G06T 7/70*      (2017.01)
*H04N 5/232*    (2006.01)
(Continued)

(52) U.S. Cl.
CPC ............ *G06T 7/70* (2017.01); *A46B 15/0002* (2013.01); *G06K 9/00228* (2013.01); *G06K 9/00362* (2013.01); *H04N 5/23216* (2013.01); *H04N 5/23222* (2013.01); *H04N 5/23293* (2013.01); *A46B 2200/1066* (2013.01)

(58) Field of Classification Search
CPC ........ A46B 2200/1066; A46B 15/0002; G06T 7/70; G06K 9/00228; G06K 9/00362; H04N 5/23216; H04N 5/23222; H04N 5/23293
See application file for complete search history.

(56) References Cited

U.S. PATENT DOCUMENTS 942,708 A    12/1909 Blot
3,783,364 A    1/1974 Gallanis et al.
(Continued)

FOREIGN PATENT DOCUMENTS

DE          19506129 A1    8/1996
DE     102008027317 A1    12/2009
(Continued)

OTHER PUBLICATIONS

Extended European Search report, dated Jul. 20, 2016, 7 pages.
(Continued)

*Primary Examiner* — William C Vaughn, Jr.
*Assistant Examiner* — Naod W Belai
(74) *Attorney, Agent, or Firm* — Vladimir Vitenberg

(57) ABSTRACT

A device and a method for determining a position of a user's body portion. The device includes a camera, configured to capture the body portion, and a display for providing visual feedback. A sensor determines at least one of a roll angle, a pitch angle, and a yaw angle of the device, and an interface receives picture data related to a pictorial representation of the body portion captured and sensor data related to the determined angle of the device. An analyzer analyzes, based on the picture data, whether the captured body portion is within a predetermined region of the picture and, based on the sensor data, whether at least one of the roll angle, the pitch angle, and the yaw angle is within a predetermined angle range. The method includes capturing the body portion, providing visual feedback, receiving angle data, receiving picture data, and analyzing whether the captured body portion is within a predetermined region and whether at least one of the roll, pitch, and yaw angles is within a predetermined angle range.

15 Claims, 13 Drawing Sheets

(51) Int. Cl.
*A46B 15/00* (2006.01)
*G06K 9/00* (2006.01)

(56) References Cited

U.S. PATENT DOCUMENTS

| | | | |
|---|---|---|---|
| 4,716,614 A | 1/1988 | Jones |
| 5,561,881 A | 10/1996 | Klinger et al. |
| 5,701,629 A | 12/1997 | O'Brien |
| 5,796,325 A | 8/1998 | Lundell et al. |
| 5,864,288 A | 1/1999 | Hogan |
| 5,930,858 A | 8/1999 | Jung |
| 5,944,531 A | 8/1999 | Foley |
| 6,102,284 A | 8/2000 | Myers et al. |
| 6,519,579 B1 | 2/2003 | Plankensteiner et al. |
| 6,536,068 B1 | 3/2003 | Yang et al. |
| 6,611,780 B2 | 8/2003 | Lundell et al. |
| 6,752,627 B2 | 6/2004 | Lin |
| 6,754,928 B1 | 6/2004 | Rosen |
| 6,808,298 B2 | 10/2004 | Christensen |
| 6,902,397 B2 | 6/2005 | Farrell et al. |
| 7,024,717 B2 | 4/2006 | Hilscher et al. |
| 7,411,511 B2 | 8/2008 | Kennish et al. |
| 7,748,069 B2 | 7/2010 | Dawley |
| 7,890,193 B2 | 2/2011 | Tingey |
| 7,976,388 B2 | 7/2011 | Park et al. |
| 8,175,840 B2 | 5/2012 | Hwang |
| 8,176,591 B2 | 5/2012 | Iwahori et al. |
| 8,201,295 B2 | 6/2012 | Gatzemeyer et al. |
| 8,320,682 B2 | 11/2012 | Froeba et al. |
| 8,341,791 B2 | 1/2013 | Iwahori |
| 8,393,037 B2 | 3/2013 | Iwahori et al. |
| 8,479,341 B2 | 7/2013 | Iwahori |
| 8,544,131 B2 | 10/2013 | Braun et al. |
| 8,743,051 B1 | 6/2014 | Moy et al. |
| 8,744,192 B2 | 6/2014 | Ortins et al. |
| 9,174,351 B2 | 11/2015 | Binder |
| 9,848,174 B2 | 12/2017 | Binder |
| 9,950,434 B2 | 4/2018 | Binder |
| 9,950,435 B2 | 4/2018 | Binder |
| 10,064,711 B1 | 9/2018 | Richter |
| 10,220,529 B2 | 3/2019 | Binder |
| 10,449,681 B2 | 10/2019 | Binder |
| 2002/0133308 A1 | 9/2002 | Lundell |
| 2003/0115694 A1 | 6/2003 | Pace |
| 2004/0019990 A1 | 2/2004 | Farrell |
| 2004/0053190 A1 | 3/2004 | Lin |
| 2005/0000044 A1 | 1/2005 | Hilscher et al. |
| 2006/0040246 A1 | 2/2006 | Ding |
| 2006/0096046 A1 | 5/2006 | Hilscher |
| 2007/0136964 A1 | 6/2007 | Dawley |
| 2007/0182571 A1 | 8/2007 | Kennish |
| 2007/0234493 A1 | 10/2007 | Hilscher et al. |
| 2007/0270221 A1 | 11/2007 | Park |
| 2008/0010771 A1 | 1/2008 | Hilscher et al. |
| 2008/0022469 A1 | 1/2008 | Hilscher |
| 2008/0022470 A1 | 1/2008 | Hilscher |
| 2008/0022471 A1 | 1/2008 | Hilscher |
| 2008/0022501 A1 | 1/2008 | Hilscher |
| 2008/0022503 A1 | 1/2008 | Hilscher |
| 2008/0028549 A1 | 2/2008 | Hilscher |
| 2008/0032265 A1 | 2/2008 | Hilscher |
| 2008/0109973 A1 | 5/2008 | Farrell et al. |
| 2008/0196185 A1 | 8/2008 | Gatzemeyer et al. |
| 2008/0313829 A1 | 12/2008 | Dabrowski |
| 2009/0092955 A1 | 4/2009 | Hwang |
| 2009/0130636 A1 | 5/2009 | Hwang |
| 2009/0143914 A1 | 6/2009 | Cook et al. |
| 2009/0291422 A1 | 11/2009 | Puurunen |
| 2009/0317770 A1 | 12/2009 | Gatzemeyer |
| 2010/0281636 A1 | 11/2010 | Ortins |
| 2011/0010875 A1 | 1/2011 | Iwahori et al. |
| 2011/0010876 A1 | 1/2011 | Iwahori et al. |
| 2011/0041269 A1 | 2/2011 | Iwahori |
| 2011/0146016 A1 | 6/2011 | Gatzemeyer et al. |
| 2012/0151697 A1 | 6/2012 | Farrell et al. |
| 2012/0266397 A1 | 10/2012 | Iwahori |
| 2012/0310593 A1 | 12/2012 | Bates |
| 2014/0065588 A1 | 3/2014 | Jacobson et al. |
| 2014/0246049 A1 | 9/2014 | Ikkink et al. |
| 2015/0044629 A1 | 2/2015 | Wang |
| 2016/0235357 A1 | 8/2016 | Ohmer |
| 2016/0374609 A1 | 12/2016 | Vetter et al. |
| 2017/0065386 A1 | 3/2017 | Farrell et al. |
| 2017/0069083 A1 | 3/2017 | Vetter et al. |
| 2017/0236298 A1 | 8/2017 | Vetter |
| 2017/0238692 A1 | 8/2017 | Sarubbo |
| 2018/0192765 A1 | 7/2018 | Jeanne |

FOREIGN PATENT DOCUMENTS

| | | |
|---|---|---|
| DE | 102009048117 A1 | 4/2011 |
| DE | 102009048118 A1 | 4/2011 |
| EP | 1593001 B1 | 6/2012 |
| EP | 2833325 A1 | 2/2015 |
| EP | 2406697 B1 | 4/2016 |
| EP | 3141151 A1 | 3/2017 |
| EP | 3238565 | 11/2017 |
| FR | 2832298 A1 | 5/2003 |
| JP | 09168428 | 6/1997 |
| JP | 11346833 | 12/1999 |
| JP | 2003534095 | 11/2003 |
| JP | 2011146049 | 7/2011 |
| WO | WO2006137648 A1 | 12/2006 |
| WO | WO2007032015 A2 | 3/2007 |
| WO | WO2007112112 A1 | 10/2007 |
| WO | WO2011073010 A1 | 6/2011 |
| WO | WO2014103412 A1 | 7/2014 |
| WO | WO2014202438 A1 | 12/2014 |
| WO | WO2016020803 | 2/2016 |

OTHER PUBLICATIONS

Bocksch, M. et al. Pedestrian Activity Classification to Improve Human Tracking and Localization. In: Proceedings of the 4th International Conference on Indoor Positioning and Indoor Navigation (IPIN), 2013, S. 667-671.
European Search Report for 16155933.1-1901 dated Jul. 20, 2016.
DeMenthon, D.F. et al. "Model-Based Object Pose in 25 Lines of Code", Computer Vision Laboratory, ECCV 1992, pp. 335-343.
Ernst, A. et al. "Fast face detection and species classification of African great apes", AVSS 2011, IEEE 8th International Conference on Advanced Video and Signal-based Surveillance.
Kueblbeck, C. et al. "Face detection and tracking in video sequences using the modified census transformation", Journal on Image and Visiong Computing, vol. 24, issue 6, pp. 564-572, 2006.
Saragih, J et al. "Deformable Model Fitting by Regularized Landmark Mean'Shifts", International Journal of Computer Vision, 2011 91: 200-215.

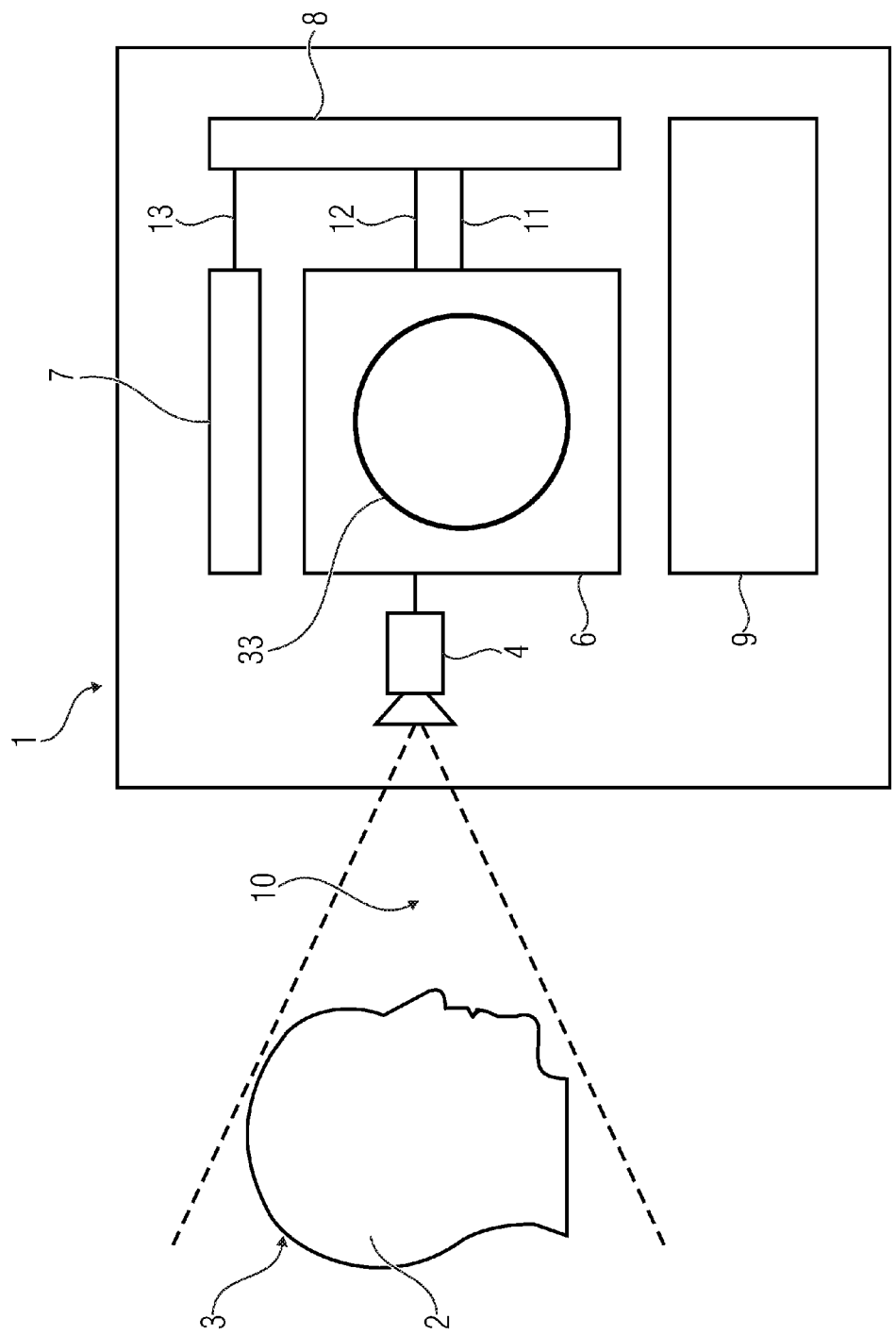

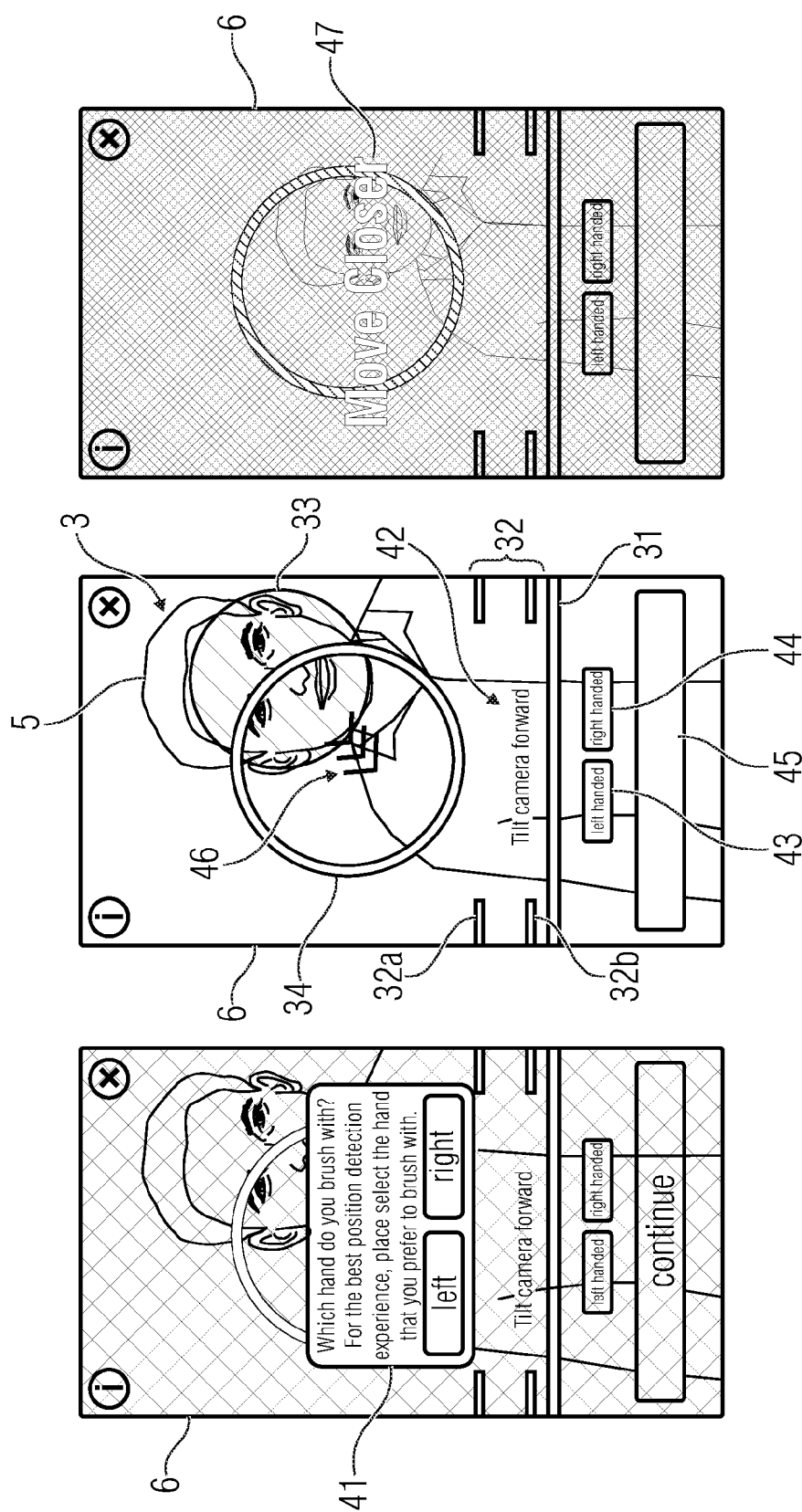

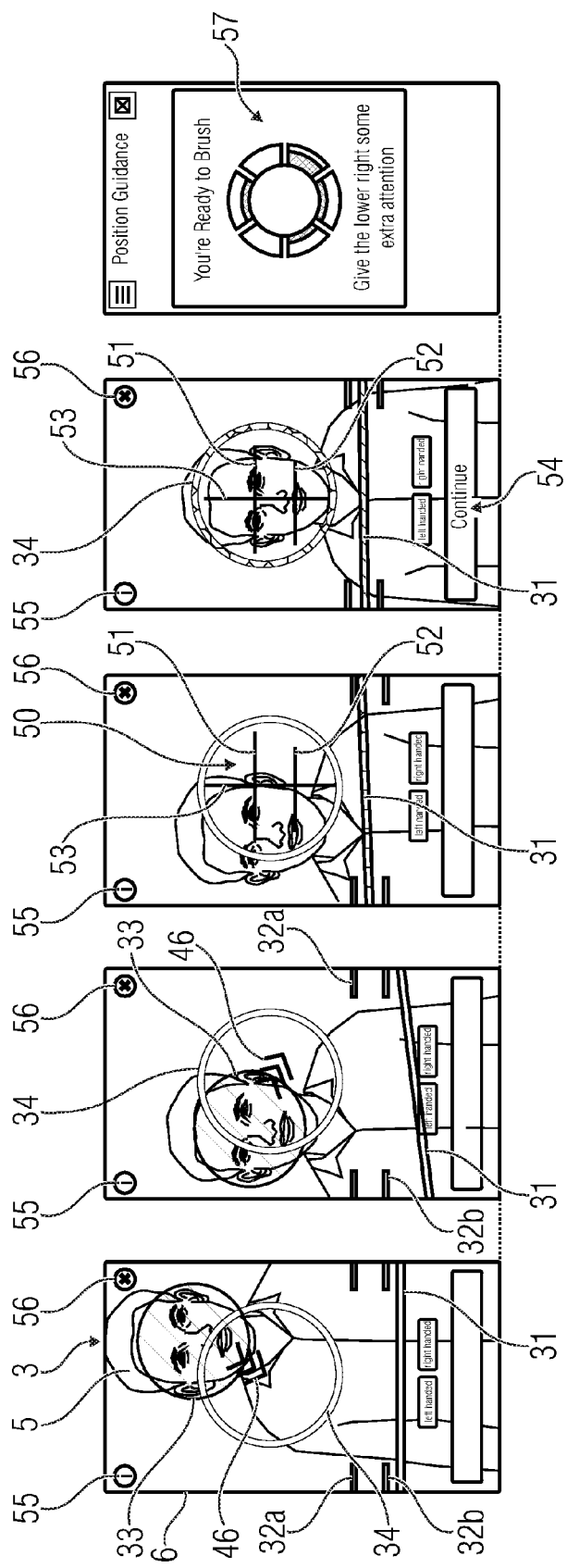

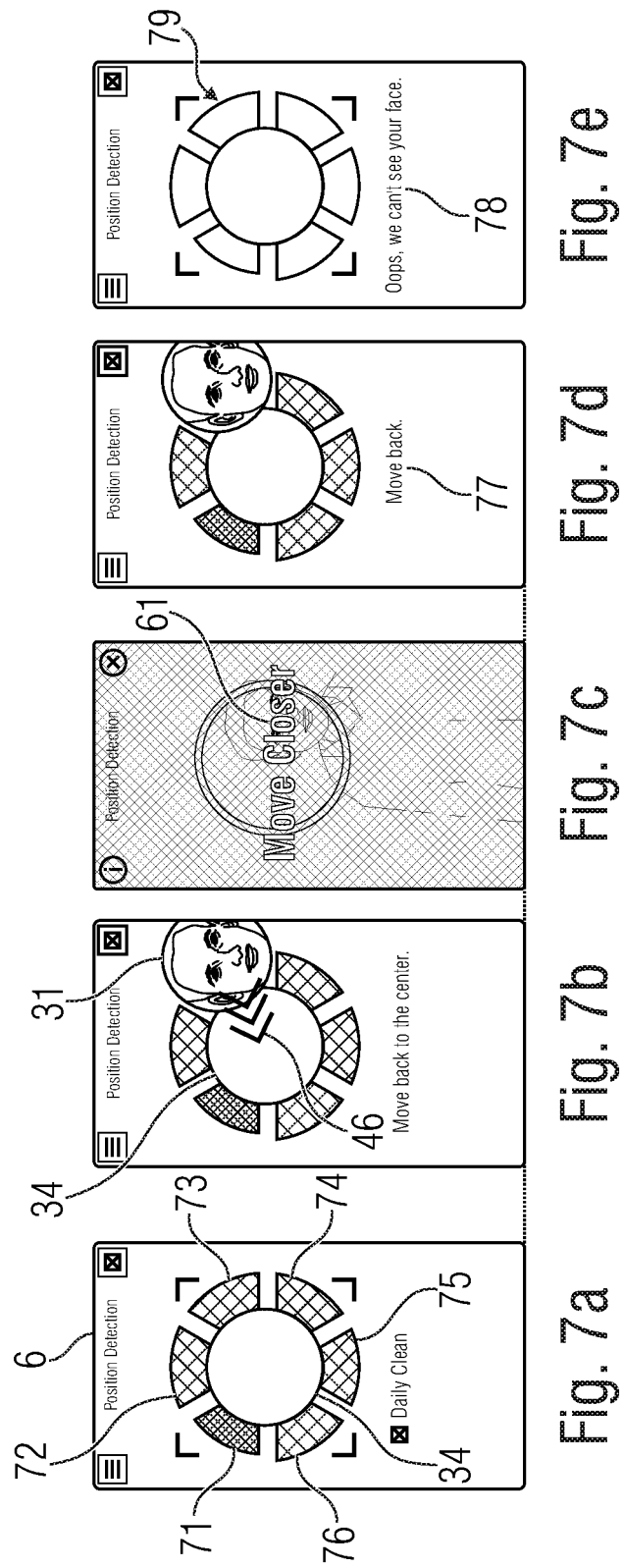

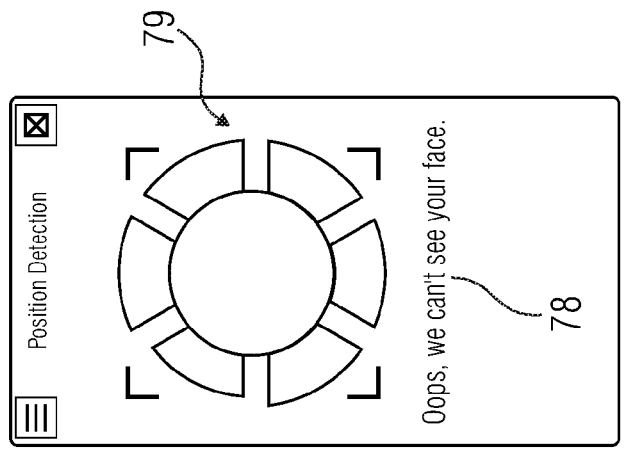
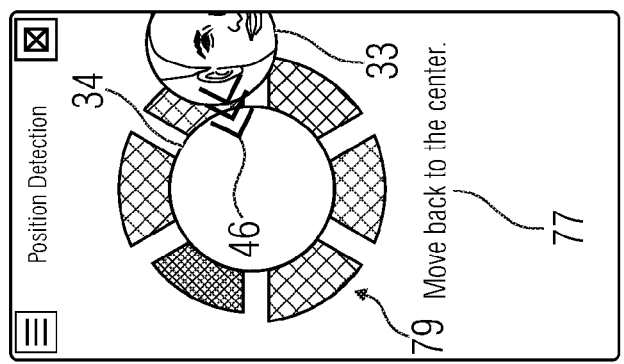
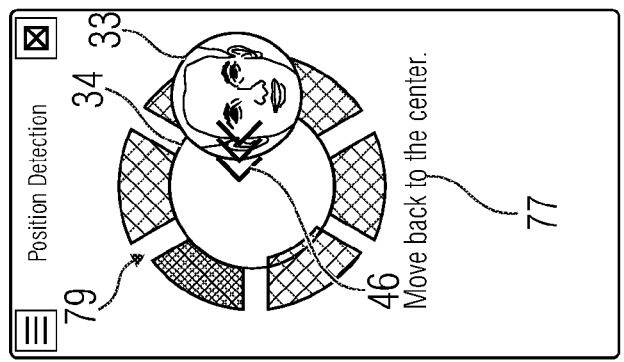
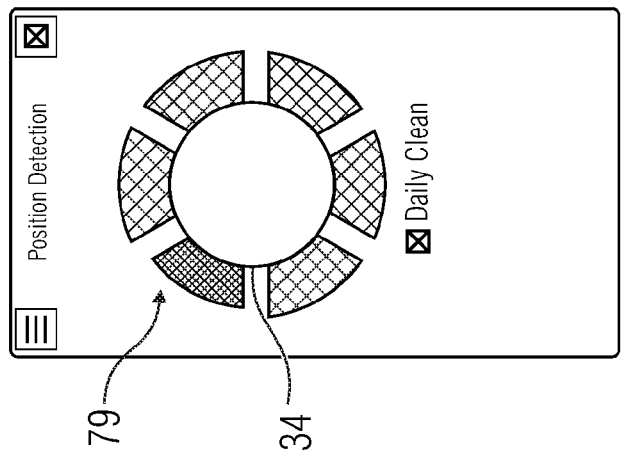

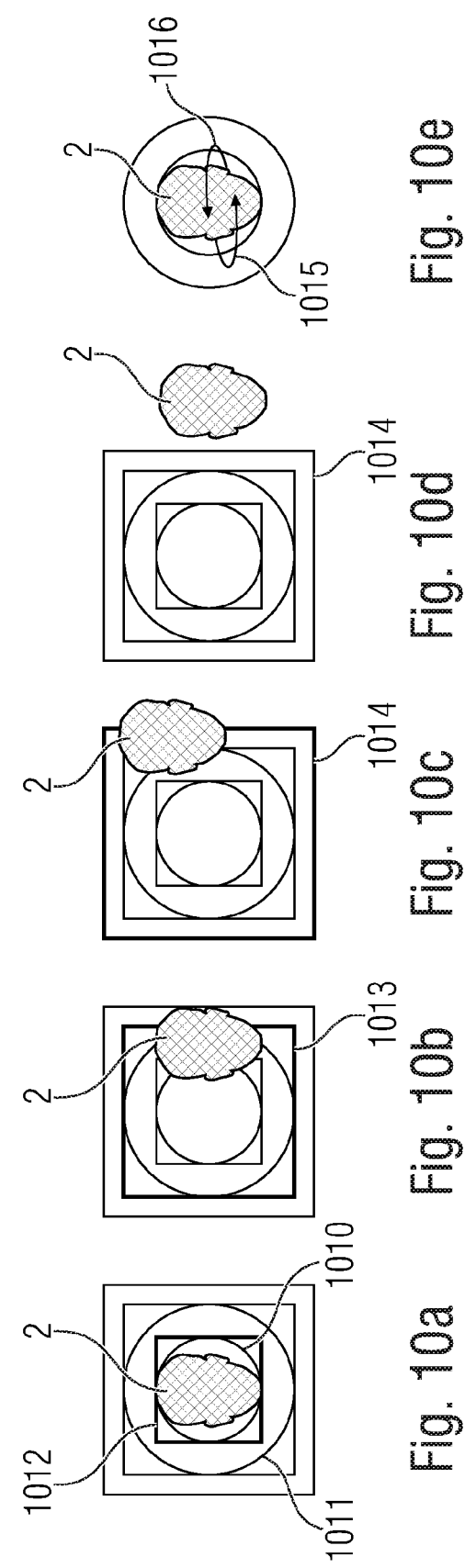

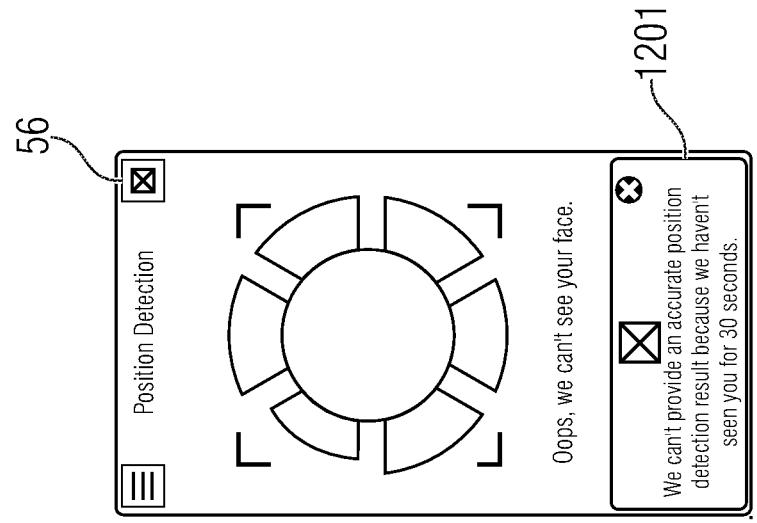
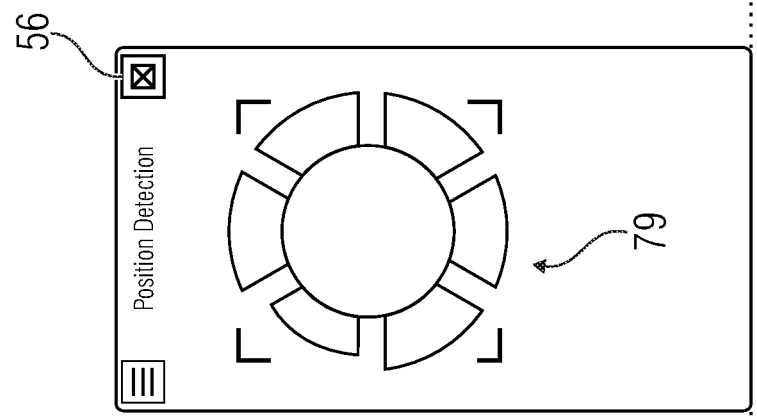
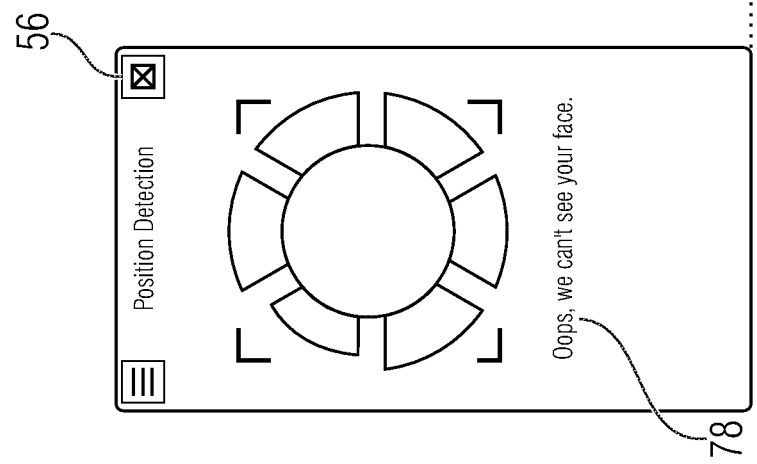
Fig. 12c
Fig. 12b
Fig. 12a

INTERACTIVE SYSTEM SETUP CONCEPT

FIELD OF THE INVENTION

The present disclosure is directed to a device and a method for determining a position of a body portion of a user.

BACKGROUND

The disclosure may be used as a guided system setup process. For example, it may be used by consumers of a connected personal care device, such as, for instance, a tooth brush, a hair removal device or the like, in connection with a mobile device, such as, for instance, a smartphone, a mobile camera or the like. The personal care device may communicate with the mobile device via a wireless connection, for example via Bluetooth. The mobile device runs an application that connects to the personal care device.

Such a system is described in EP15184240.8, which exemplarily mentions a smartphone in connection with a toothbrush. The present invention may, for instance, be used for the system described in EP15184240.8, for example in order to provide a guided system setup process for a brushing position determination for power toothbrushes. The system which is described as an example in EP15184240.8 is exemplarily depicted in FIG. 14. Said system comprises a power toothbrush 1401 with an integrated 3D acceleration sensor 1402 and a wireless Bluetooth radio interface, a smartphone 1403, a smartphone holder 1404 to affix the phone 1403 to a bathroom mirror 1405 and a smartphone application. The smartphone application connects to the power toothbrush 1401, receives sensor data 1406 from the toothbrush 1401, gathers video frames 1407 from the smartphone's built-in front camera 1408 and processes these data streams.

Also the processing is described in EP15184240.8. The processing contains the determination of a brushed position, based on the result of the processed sensor data 1406 from the brush 1401 and the processed image data 1407 from the front camera 1404. Finally, both results are fused mathematically to get the most accurate, precise and stable brushing position information.

The system described in EP15184240.8 requires certain cooperation from the consumers 1409 in order to work properly. It may consist, according to an example, of a connected power toothbrush 1401, a smartphone 1403, a mobile application, a smartphone holder 1404 with a suction cup and the user 1409 himself.

All components need to be arranged in certain positions. These are the positions the algorithms of the system have been trained with. Only if all components are arranged correctly, the gathered sensor data can be processed properly.

Thus, it is desired to improve the usability of existing systems for a user when using said systems.

SUMMARY OF THE DISCLOSURE

According to a first aspect, it is suggested to provide a device for determining a position of a body portion of a user, the device comprising a camera configured to capture the body portion of the user to obtain a pictorial representation of the body portion of the user, and a display for providing visual feedback to the user.

The device further comprises at least one sensor for determining at least one of a roll angle, a pitch angle and a yaw angle of the device.

Furthermore, the device comprises an interface for receiving picture data related with the pictorial representation of the body portion captured by the camera and for receiving sensor data related with the determined angle of the device determined by the at least one sensor.

Still further, the device comprises an analyzer. The analyzer is configured to analyze, based on the picture data, whether the captured body portion is within a predetermined region of the picture captured by the camera. The analyzer is further configured to analyze, based on the sensor data, whether the roll angle and/or the pitch angle and/or the yaw angle of the device is within a predetermined angle range. According to this concept, the device is enabled to detect a certain body portion of the user, which may be, for instance, a face of the user when he is shaving or brushing his/her teeth.

A display enables the device to provide instantaneous visual feedback to the user. For example, if the user would like the camera to capture his face but the device is arranged such that the focus of the camera may point to the user's chest, the display provides immediate feedback to the user by displaying the user's chest on the display. Additionally or alternatively, images and/or messages may be displayed on the display in order to provide visual feedback to the user. For example, if the focus of the user points onto the user's chest instead of the user's face, upward directed arrows may be displayed to provide visual feedback to the user informing him/her that the camera is adjusted too low.

It may also be possible that a message, such as a text message in a pop-up window, for instance, may be displayed on the display which text message may inform the user to re-adjust the camera. Accordingly, the user may receive a corresponding information by means of visual feedback that the relative position between him/her and the device shall be adjusted in order to capture his face, e.g. the user may move his face downwards, i.e. into the direction of the focus of the camera, and/or the device may be moved upwards, i.e. into the direction of the face of the user. If the user's face is captured by the camera, the device provides further visual feedback to the user in order to assist him/her to determine a relative orientation between the user and the device, wherein said relative orientation is identical or approximate to a desired or predetermined relative orientation.

In order to check whether and/or to what extent the current relative orientation between the user and the device matches the predetermined relative orientation, the analyzer is configured to analyze whether the captured body portion, e.g. the user's face, is within a predetermined region of the picture captured by the camera. The user may receive instantaneous visual feedback via the display. By said instantaneous feedback, the user may be prompted to adjust the relative orientation, if necessary, such that he/she will be prompted to move his/her body portion, e.g. face, into said predetermined region of the picture. If the analyzer analyzes that the user's face may be at least partly outside the predetermined region of the picture, arrows pointing to the center of the predetermined region may be displayed on the display as an example in order to provide visual feedback to the user informing him/her to move his/her face into the direction in which the arrows point, i.e. into the predetermined region of the picture.

Additionally or alternatively, the captured body portion itself, e.g. the user's face, may be displayed on the display in order to provide visual feedback to the user. In this case, the user directly sees on the display which body portion is currently captured by the camera. The device provides a further mechanism to assist the user in determining a certain relative orientation. Namely, the analyzer also analyzes whether the device may be correctly angled towards the user, by analyzing angle data provided by the at least one sensor. The at least one sensor may provide information as to at least one of the roll angle, the pitch angle and the yaw angle of the device.

The user may also get instantaneous feedback via the display which may display the currently determined respective angle. The analyzer analyzes whether the currently determined respective angle is within a predetermined angle range. Said predetermined angle range may also be visually displayed to the user via the display in order to provide a visual feedback to the user as to a current angle. If necessary, the user may adapt the relative orientation between him/her and the device, if necessary, such that the currently determined respective angle corresponds (at least partly) to the predetermined respective angle range. Accordingly, the suggested concept may provide a device configured to provide a guided system setup process for assisting a user in setting up the device such that it can be used as desired.

According to an example, the analyzer may comprise a body portion detection algorithm to determine the position of the body portion within the focus of the camera. Accordingly, the analyzer may detect a desired body portion, e.g. an arm, a leg or a face of a user. The analyzer may further be configured to track the detected body portion when the user moves said body portion within the focus of the camera. Thus, the device may be enabled to detect and track the recent position of the detected body portion within the picture captured by the camera.

According to another example, the body portion of the user may be the face of the user, and the analyzer may comprise a face detection algorithm to determine the position of the face within the focus of the camera. Accordingly, the device may be enabled to detect and track the face of a user within the picture captured by the camera. Conventional face tracking algorithms, such as the Fraunhofer SHORE algorithm, may be used in order to detect and track the face.

According to another example, the analyzer may be configured to determine, based on at least the picture data and optionally on the angle data, a relative orientation of the device relative to the detected body portion of the user, wherein said relative orientation is a relative distance between the detected body portion and the device and/or a relative position between the detected body portion and the device along a plane that is substantially perpendicular to the orientation of the camera. In other words, the device may be enabled to determine whether the user moves his/her body portion forward or backward, i.e. towards the device or away from the device. Furthermore, the device may be enabled to determine whether the user may move his/her body portion into one or more of the directions left, right, upwards or downwards with respect to the device.

According to another example, the analyzer may be configured to overlay the pictorial representation of the body portion with the predetermined region of the picture and, if the analyzer analyzes that the body portion is at least partly outside the predetermined region of the picture, the device is configured to display a message and/or an image on the display in order to prompt the user to alter the relative orientation between the body portion and the device. In other words, the device is configured to check by means of the pictorial representation whether the captured body portion is located inside, at least partly outside or completely outside the predetermined region of the picture. The predetermined region of the picture may be a spot of a certain size located inside the captured picture. The pictorial representation, i.e. captured picture of the body portion, is overlayed with the predetermined region. In other words, the predetermined region of the picture, e.g. the spot of a certain size, and the picture of the captured body portion may be shown together within a common picture or frame. Stated differently, the predetermined region of the picture may be shown within the same image as the picture currently captured by the camera. The currently captured picture and the predetermined region of the picture may be mutually displayed on the display. This visualization may assist the user in altering the relative orientation between the body portion and the device until the body portion is located within the predetermined region of the picture.

According to another example, the at least one sensor may be configured to determine the at least one of a roll angle, a pitch angle and a yaw angle of the device and to display the determined roll angle and/or pitch angle and/or yaw angle of the device on the display. For example, at least the pitch angle and the roll angle may be displayed by means of a level bar. The level bar may change its position and/or orientation on the screen depending on the respective angle determined by the at least one sensor. The level bar may be displayed together with a pictorial representation of the predetermined angle range, which may be a spot of a certain size, for example a horizontally extending rectangular region. This visualization may assist the user in altering the orientation of the device.

According to another example, if the at least one sensor determines that the roll angle and/or the pitch angle and/or the yaw angle lies outside the predetermined angle range, the device may be configured to display an image and/or a message on the display prompting the user to position the device such that it comprises a roll angle and/or a pitch angle and/or a yaw angle that lies within said predetermined angle range. For example, the message may be a text message that is displayed on the display, which text message informs the user to adapt the respective angle of the device.

Additionally or alternatively an image may be displayed informing the user about the deviation of the current angle from the predetermined angle. The image may be, for instance, a color switch of a displayed level bar. For example, if the device comprises a respective angle that is within the predetermined angle range, then the level bar may be displayed in green color. However, if the device may not comprise a respective angle that is within the predetermined angle range, then the level bar may be displayed in red color.

According to an example, the predetermined angle range of the roll angle and/or the pitch angle and/or the yaw angle may lie between +3° and −3°. In other words, a predetermined angle may be zero degrees, wherein a deviation of +3° to −3° from said predetermined angle may represent the predetermined angle range. Thus, a total angle range may have a value or magnitude of 6°.

According to another example, the predetermined region of the picture may cover about 60% to 80%, and preferably 75% of the focus of the camera. In other words, the predetermined region covers about 60% to 80%, and preferably 75% of the picture captured by the camera. The predetermined region may, for instance, be a spot having a size of about 60% to 80%, and preferably 75% of the focus of the camera. Thus, the captured detected body portion shall preferably also cover about 60% to 80%, and preferably 75% of the picture captured by the camera. This percentage of the body portion relative to the entire picture helps in determining the current position of the body portion within the picture.

According to another example, the device may comprise a communication interface that is configured to communicate with a personal care device in order to receive information from said personal care device. The Communication interface may be a wireless communication interface using a wireless communication protocol such as Wi-Fi, Bluetooth, ZigBee, WiMAX or the like.

According to a further aspect, a method for determining a position of a body portion of a user is provided, the method comprising capturing the body portion of the user in order to obtain a pictorial representation of the body portion of the user, and providing visual feedback to the user.

The method further comprises receiving angle data corresponding to at least one of a roll angle, a pitch angle and a yaw angle of a device by means of which the pictorial representation was captured. Furthermore, the method comprises receiving picture data related with the pictorial representation of the body portion, and analyzing, based on the picture data, whether the captured body portion is within a predetermined region of the picture captured by the device. Still further, the method comprises analyzing, based on the angle data, whether the roll angle and/or the pitch angle and/or the yaw angle of the device is within a predetermined angle range.

According to a further aspect, a computer program is provided, the computer program for performing, when running on a computer, the above-mentioned method.

BRIEF DESCRIPTION OF THE DRAWINGS

In the following, embodiments of the present invention are described in more detail with reference to the figures, in which FIG. 1 shows an example of an embodiment of the device, FIGS. 4A-4C show examples of a screen that may be displayed on a display when a position of a body portion of a user is to be determined, FIGS. 5A-5E show examples of a screen that may be displayed on a display when a user may alter his/her position relative to the device along a plane that is substantially perpendicular to the orientation of the camera, FIGS. 7A-7E show examples of a screen that may be displayed on a display when a body portion of a user may be determined during an exemplary brushing session, FIGS. 9A-9D show examples of a screen that may be displayed on a display when the user's body portion may be moved outside certain zones, FIGS. 10A-10E may show these certain zones of FIGS. 9A-9D, FIGS. 12A-12C show examples of a screen that may be displayed on a display when the user's body portion may not be detectable.

DETAILED DESCRIPTION

Figure 2C:
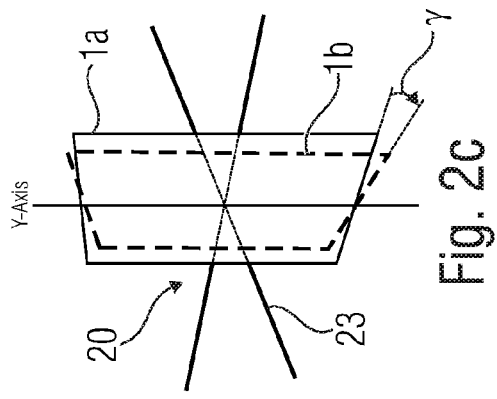
FIGS. 2A-2C show a roll angle, a pitch angle and a yaw angle of the device.

Equal or equivalent elements or elements with equal or equivalent functionality are denoted in the following description by equal or equivalent reference numerals.

FIG. 1 shows a device 1 for determining a position of a body portion 2 of a user 3. The device 1 comprises a camera 4 configured to capture the body portion 2 of the user 3 to obtain a pictorial representation of the body portion 2 of the user 3.

The device 1 further comprises a display 6 for providing visual feedback to the user 3.

The device 1 further comprises at least one sensor 7 for determining at least one of a roll angle, a pitch angle and a yaw angle of the device 1.

The device 1 further comprises an interface 8 for receiving picture data related with the pictorial representation 5 of the body portion 2 captured by the camera 4 and for receiving sensor data related with the determined angle of the device 1 determined by the at least one sensor 7.

The device 1 further comprises an analyzer 9 to analyze, based on the picture data, whether the captured body portion 2 is within a predetermined region 33 of the picture captured by the camera 4, and to analyze, based on the sensor data, whether the roll angle and/or the pitch angle and/or the yaw angle of the device 1 is within a predetermined angle range.

In the example shown in FIG. 1, the body portion 2 of the user 3 is the user's head. The camera 4 is directed onto the user's head 2. The relative position or distance between the user's head 2 and the camera 4 is chosen such that the focus 10 of the camera 4 substantially captures the entire head 2 of the user 3.

The camera 4 obtains a pictorial representation of the user's head 2. Picture data that is related with the pictorial representation is fed to the interface 8. For this purpose, the camera 4 may be connected to the interface 8 via a physical or wireless data transmission channel 12. The data transmission channel 12 may be configured for unidirectional or bidirectional data transmission.

The interface 8 further receives sensor data related with the determined angle of the device 1. The sensor data may be provided by physical or wireless data transmission channel 13 between sensor 7 and interface 8. The data transmission channel 13 may be configured for unidirectional or bidirectional data transmission.

For determining an angle of the device 1, at least one sensor 7 is provided. The sensor 7 may, for instance, be an inertial sensor that is configured to determine at least one of a roll angle, a pitch angle and a yaw angle of the device 1. The inertial sensor may preferably be configured to determine all three angles. It may also be possible that the device 1 comprises an individual sensor for each of the aforementioned three angles, i.e. a first sensor for determining the roll angle of the device 1, a second sensor fort determining the pitch angle of the device 1, and a third sensor for determining the yaw angle of the device 1. In any case, the interface 8 is configured to receive the respective sensor data related with the respective one of the pitch angle, roll angle and yaw angle.

Accordingly, the interface 8 is configured to receive picture data related with the pictorial representation captured by the camera 4, as well as sensor data related with a current angle of the device 1 and being determined by the at least one sensor 7.

The device 1 further comprises an analyzer 9. The analyzer 9 may also be connected to the interface 8 via a physical or wireless data transmission channel. The data transmission channel may be configured for unidirectional or bidirectional data transmission. The analyzer 9 may, for instance, be a CPU or any other type of logical unit that is configured to process the picture data and the sensor data, respectively.

Based on the picture data related with the pictorial representation of the user 3, the analyzer 9 is configured to analyze whether the captured body portion, i.e. the user's head 2, particularly the pictorial representation of the user's head 2, is within a predetermined region of the picture captured by the camera 4. Said predetermined region of the picture may be a cross hair, a rectangle, a circle 33, or the like, as exemplarily shown in FIG. 1. It may also be displayed on the display 6. However, said predetermined region of the picture will be explained in more detail with reference to the following Figures, for example with reference to FIG. 4B.

Based on the sensor data related with the determined angle of the device 1, the analyzer 9 is configured to analyze whether the determined roll angle and/or pitch angle and/or yaw angle is within a predetermined angle range.

The device 1 may, for instance, be a mobile phone. The interface 8 may be connected with a sensor 7 that may already be available within the mobile phone 1. The interface 8 may further be connected with a camera 4 that may already be available within the mobile phone 1. Furthermore, the interface 8 may be connected with a display 6 that may already be available within the mobile phone 1. The analyzer 9 may be the CPU of the mobile phone. The interface 8 may be connected with the CPU 9 or be a part of the CPU 9.

Figure 2B:
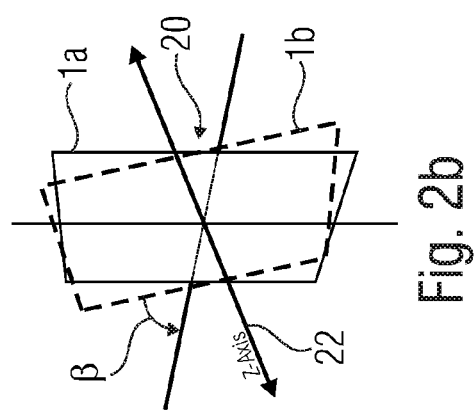
Figure 2A:
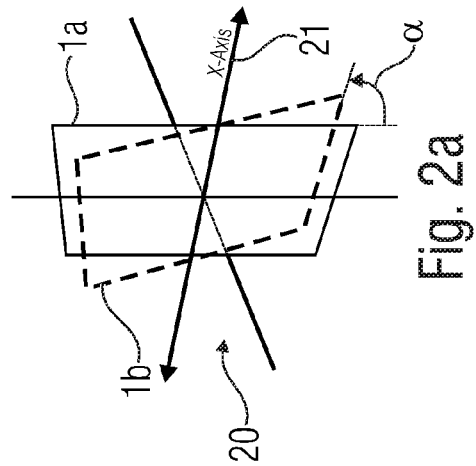

FIGS. 2A, 2B and 2C depict the above mentioned three angles along which the device 1 may be oriented, namely the pitch angle, the roll angle and the yaw angle. Each of the Figures shows a coordinate system 20 having an X-Axis 21, a Z-Axis 22 and a Y-Axis 23. Furthermore, each of the Figures exemplarily shows the orientation of the device 1 within said coordinate system 20.

As can be seen in FIG. 2A, the device 1 is shown in a first or initial position 1a. If the device 1 rotates along the X-Axis 21, it moves into a second or deflected position 1b, shown in dashed lines. The angle between the first position 1a and the second position 1b of the device 1 may be referred to as the pitch angle α.

As can be seen in FIG. 2B, the device 1 is shown in a first or initial position 1a. If the device 1 rotates along the Z-Axis 22, it moves into a second or deflected position 1b, shown in dashed lines. The angle between the first position 1a and the second position 1b of the device 1 may be referred to as the roll angle β.

As can be seen in FIG. 2C, the device 1 is shown in a first or initial position 1a. If the device 1 rotates along the Y-Axis 23, it moves into a second or deflected position 1b, shown in dashed lines. The angle between the first position 1a and the second position 1b of the device 1 may be referred to as the yaw angle γ.

Figure 3C:
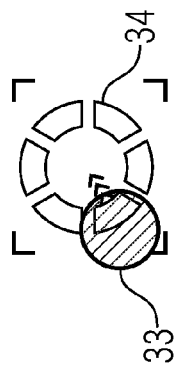
FIGS. 3A-3C show examples for a screen that may be displayed on a display in order to visualize the roll angle, the pitch angle and the yaw angle of the device.
Figure 3B:

The device 1 may be configured to display the respective angle on the display 6 in order to provide visual feedback to the user 3. For example, the device 1 may be configured to display a level bar on the display 6. An example of a level bar and a possible way of visual angle indication is shown in FIGS. 3A and 3B.

Figure 3A:
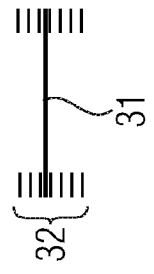

As shown in FIG. 3A, the display 6 may display a level bar 31 and one or more indicator marks 32 in order to provide visual feedback to the user 3 regarding a current pitch angle and/or a current roll angle of the device 1. The indicator marks 32 may be represented by small lines arranged at the left side and the right side of the display 6. The indicator marks 32 may represent a predetermined angle range.

As the device 1 rotates around the X-Axis 21 (FIG. 2A), the pitch angle α increases. As can be seen in FIG. 3A, this variation in the pitch angle α may be represented by an up and down movement of the level bar 31. For instance, as the device 1 rotates in a forward direction as depicted in FIG. 2A, the pitch angle α increases in a positive direction, and the level bar 31 moves downwards. As the device 1 rotates in the opposite backward direction, the pitch angle α decreases or increases in a negative direction, and the level bar 31 moves upwards. It may also be possible that the level bar 31 moves upwards as the pitch angle α increases in a positive direction, and that the level bar 31 moves downwards as the pitch angle α increases in a negative direction.

As the device 1 rotates around the Z-Axis 22 (FIG. 2B), the roll angle β increases. As can be seen in FIG. 3B, this variation in the roll angle β may be represented by a left and right tilt of the level bar 31. For instance, as the device 1 rotates left, the level bar 31 may also tilt left, as depicted in FIG. 3B. Otherwise, if the device 1 turns right, the level bar 31 may also tilt right.

A different visualization may be chosen for the yaw angle. As can be seen in FIG. 3C, two different kinds of circles 33, 34 may be displayed on the display 6 in order to provide visual feedback to the user 3 regarding a current yaw angle of the device 1. The first circle 33 may have an outer diameter that substantially corresponds to an inner diameter of the second circle 34. In other words, the first circle 33 may fit into the second circle 34. These two circles 33, 34 are only mentioned as an example for visual feedback. Other geometrical forms, arrows, colors, text messages, or the like may also be displayed on the display 6 in order to provide proper feedback to the user 3.

As long as the device 1 is within its initial position (FIG. 2C—reference numeral 1a), the first circle 33 is arranged within the second circle 34 (FIG. 3C). As the device 1 rotates around the Y-Axis 23, the yaw angle γ increases. The more the yaw angle γ increases, the more the first circle 33 moves outside the second circle 34, as exemplarily shown in FIG. 3C. For example, if the device 1 is rotated left, as shown in FIG. 2C, the first circle 33 may move to the left outside the second circle 34, and vice versa. However, it may also be possible that the first circle 33 may move to the right outside the second circle 34 if the device is rotated left, and vice versa.

The following Figures may exemplarily show some possible visualizations on the display 6 of the device 1 in order to provide visual feedback to the user 3 regarding a current pitch angle and/or roll angle and/or yaw angle of the device 1 as well as visual feedback regarding the body portion that is currently captured by the camera 4 of the device 1.

In this example, the device 1 may be used to guide the user 3 through a setup process in order to arrange the device 1 relative to the user 3 such that the device 1 is usable by the user 3 as desired. For the following description with reference to the following figures, it is assumed that the device 1 will be set up for a subsequent usage with a personal care device, for instance a toothbrush that may be configured to communicate with the device 1. Therefore, the device 1 is configured to determine the position of a body portion 2 of the user 3. In the following examples regarding the toothbrush, it may be convenient that said body portion 2 of the user 3 is, just by way of example, the user's face. Thus, the device 1 may, for instance, be configured to determine the position of the user's face relative to the device 1.

FIG. 4A shows a screen that may be displayed on the display 6 of the device 1, when the device is started for the very first time. On the display 6, a pop-up message 41 is displayed which may present a question to the user. In this example, the user is asked whether he/she prefers brushing his/her teeth with his/her left hand or with his/her right hand. The user may choose and input his selection by clicking the respective button. The display 6 may be a conventional touch screen device. After having selected and clicked the respective button, the user's choice may be used in a position detection algorithm which may be performed by the device.

FIG. 4B shows a further screen that the display 6 may display to the user 3. FIG. 4B shows a pictorial representation 5 of the user 3 which may, for example, be displayed on the display 6 in order to provide visual feedback to the user 3 regarding the body portion that is currently captured by the camera 4. Even though it may, by way of example, continuously be depicted in the Figures that the pictorial representation of the captured body portion of the user 3 is displayed on the display 6, it may also be possible that the pictorial representation of the captured body portion of the user 3 may not be displayed on the display 6.

The pictorial representation 5 is the picture or image of the user 3 that is captured by the camera 4 of the device 1. Preferably, the camera 4 captures a moving image sequence, e.g. a movie, of the user 3 and displays the user's image instantaneously on the display 6 of the device 1, so to say in real-time. Accordingly, when the user 3 moves relative to the device 1, then this relative movement is instantaneously shown on the display 6 so that the user 3 may always see his current position relative to the device 1.

FIG. 4B shows the visual elements that have been previously described with reference to FIGS. 3A, 3B and 3C, namely the level bar 31, the indicator marks 32, the first circle 33 and the second circle 34.

For example, the indicator marks 32 may be displayed on the left and on the right side of the display 6. In particular, upper indicator marks 32a and lower indicator marks 32b may be displayed. As described above, the level bar 31 and the indicator marks 32a, 32b may be used for indicating a pitch angle and/or a roll angle of the device 1. The region between the upper indicator marks 32a and the lower indicator marks 32b may represent the predetermined angle range.

In the example shown in FIG. 4B, the level bar 31 is substantially horizontal, i.e. not tilted. The level bar 31 is positioned underneath the indicator marks 32a, 32b, particularly underneath the lower indicator marks 32b. Accordingly, the user may be informed that the device 1 may comprise a roll angle that is within the predetermined angle range, but a pitch angle that is outside the predetermined angle range.

The device 1 is configured to display a message 42 on the display 6 prompting the user 3 to position the device 1 such that it comprises a roll angle that lies within the predetermined angle range, i.e. between the upper indicator marks 32a and the lower indicator marks 32b. According to this example, the device displays a message 42 on the display 6 informing the user 3 to tilt the camera 4 forward, or to respectively tilt the device 1 comprising the camera 4 forward.

Alternatively, if the level bar 31 may be positioned above the upper indicator mark 32a, the device may display an alternative message 42 on the display 6 informing the user 3 to tilt the camera 4 backward, or to respectively tilt the device 1 comprising the camera 4 backward.

Additionally or alternatively to the text message 42, an image, such as an upward or downward directed arrow or the like, may be presented to the user 3.

The message 42 and/or image may be dismissed once the device 1 has detected that it has been moved such that the level bar 31 lies within the predetermined angle range indicated by the indicator marks 32a, 32b, or after a certain time, for example after 3 seconds, whichever is longer. According to an example, messages 42 and/or images are not shown on the display 6 anymore once they are dismissed for the first time.

Furthermore, the aforementioned user's selection regarding his/her preferred hand may still be displayed on the display 6 by means of softkey buttons 43, 44. Optionally, a further softkey button 45 may be displayed on the display 6. By clicking said button 45, the user 3 may input and signal his/her desire to the device 1 to continue even though the respective determined angles (roll, pitch, yaw) may not yet be within the predetermined angle range.

Still with reference to FIG. 4B, the first circle 33 and the second circle 34 which have been previously discussed with reference to FIG. 3C, are displayed on the display 6 in order to provide visual feedback to the user 3. In this example, the device 1, and in particular the analyzer 9, comprises a face detection algorithm to determine the position of the user's face within the focus of the camera 4. As one example, the analyzer 9 may use the so-called SHORE face detection algorithm from Fraunhofer. Again, even though constantly depicted in the Figures, the body portion of the user 5 may not necessarily be displayed on the display 6. The analyzer 9 is configured to process picture data related with the captured pictorial representation of the user 3 without showing any picture data or pictorial representations on the display 6. The analyzer 9 is configured to run a body portion detection algorithm, in particular a face detection algorithm, by using the picture data without displaying them on the display 6.

In other words, if the device 1 is to determine a different body portion, such as a leg or an arm, for example, the device 1, and in particular the analyzer 9, may comprise a respective body portion detection algorithm that is configured to detect the respective body portion within the focus of the camera 4.

Referring back to FIG. 4B, the face detection algorithm enables the analyzer 9 to detect the face of the user 3 within the pictorial representation 5 captured by the camera 4. The previously discussed first circle 33 is overlayed onto the pictorial representation 5 of the user 3 such that the first circle 33 substantially covers the detected face of the user 3. The algorithm is further configured to track the face of the user 3, once it has been detected, preferably in real-time. Accordingly, if the user 3 moves his face relative to the camera 4, the algorithm is configured to continuously detect the user's face so as to follow the user's movements.

In this example, the user's face, i.e. the first circle 33, is at least partly outside the second circle 34. The inner diameter of the second circle 34 may represent the predetermined region of the picture captured by the camera 4 inside of which the user's face, i.e. the first circle 33, shall be positioned.

As can be seen in the example shown in FIG. 4B, the device 1, and in particular the analyzer 9, is configured to overlay the pictorial representation 5 of the user 3 with the predetermined region of the picture captured by the camera 4. In other words, the pictorial representation 5 of the user 3 and the predetermined region, which is represented by the second circle 34, are together displayed within the same image on the display 6, as exemplarily shown in FIG. 4B.

As mentioned above, the face detection algorithm enables the analyzer 9 to detect the user's face which detection is represented by the first circle 33 that may be displayed on the display 6. In the present example, the analyzer 9 analyzes whether the user's face is within the predetermined region. Stated differently, the analyzer 9 analyzes whether the first circle 33 is within the second circle 34. If the analyzer 9 analyzes that the face is at least partly outside the predetermined region of the picture, the device 1 is configured to display a message and/or an image 46 on the display 6 in order to prompt the user 3 to alter the relative orientation between the face and the device 1.

In the example shown in FIG. 4B, the device 1 displays an image 46 of three consecutive arrow heads pointing into the direction into which the user 3 shall move his/her face. Accordingly, this image 46 (e.g. arrow heads) is being displayed on the display 6 in order to provide visual feedback to the user 3 informing him/her in which direction he/she shall move so as to move his/her body portion inside the predetermined region 33 of the picture captured by the camera 4.

The image 46 may point into the direction of the center of the second circle 34. Accordingly, the user 3 may be prompted to alter the position of his/her face relative to the device 1, or at least relative to the camera 4. Additionally or alternatively, the position of the device 1 itself may be altered. In this example, the device 1 may be moved upward and right. Accordingly, the user 3 may be prompted to alter the position of the device 1 relative to his/her face. However, in the latter example, the user should take care that the level bar 31 is between the indicator marks 32a, 32b after having repositioned the device 1.

The image 46 and/or message may be displayed as long as the detected body portion, i.e. the user's face in this example, is at least partly outside the predetermined region 34. In other words, the image 46 and/or message may be displayed as long as the first circle 33 is at least partly outside the second circle 34. Accordingly, the image 46 and/or message may not be displayed anymore in case the analyzer 9 analyzes that the position of the device 1 relative to the user 3 is adjusted such that the user's face is within the predetermined region.

Once the analyzer 9 analyzes that the captured body portion, i.e. the face of the user 3 is within the predetermined region of the picture captured by the camera 4, and that the roll angle and/or pitch angle and/or yaw angle of the device 1 is within the predetermined angle range, the setup process may be terminated. As an example, the device 1 may then switch to an operational mode in which it communicates with a personal device, such as a toothbrush, in order to present brushing instructions to the user via the display 6.

A further example is depicted in FIG. 4C which shows a message 47 that is displayed on the display 6 if the user 3 is too far away from the device 1 or the camera 4, respectively. In this case, the user 3 is prompted by said message 47 to move closer. Accordingly, the message 47 is displayed on the display 6 in order to provide visual feedback to the user 3. Any of the previously discussed softkeys may be inactive during this display state. In other words, if the user 3 moves too far away from the device 1 or the camera 4, respectively, the screen as shown in FIG. 4C is overlayed over the current picture from the user and the message 47 is displayed on the display 6.

As described above, the device 1, and in particular the analyzer 9, is configured to determine a relative distance, or a variation (e.g. by a forward or a backward movement of the user 3 relative to the camera 4) of the relative distance, between the camera 4 and the user 3. The device 1, and in particular the analyzer 9, is also configured to determine a movement of the user 3 in front of the camera 4, which movement may be any one of a left, a right, an upward and a downward directed movement. The device 1, and in particular the analyzer 9, is also configured to detect a combination of the aforementioned movements.

Stated in more general terms, the analyzer 9 is configured to determine, based on at least the picture data and optionally on the sensor data a relative orientation of the device 1 relative to the detected body portion of the user 3, wherein said relative orientation may be at least one of a relative distance between the detected body portion and the device 1 (or the camera 4, respectively) and/or a relative position between the detected body portion and the device 1 (or the camera 4, respectively) along a plane that is substantially perpendicular to the orientation of the camera 4.

These variations in the relative orientation between the camera 4 and the user 3 shall be explained in more detail with reference to the following Figures.

FIG. 5A exemplarily shows a screen 6 displaying an image or a pictorial representation 5 of the user 3. The screen displayed on the display 6 further shows the indicator marks 32a, 32b and the level bar 31. Furthermore, the screen shows the first circle 33 representing the detected face of the user 3, and the second circle 34 representing the predetermined region within the picture captured by the camera 4.

As the face of the user 3 is at least partly outside the predetermined region 34, the image 46 in the form of three consecutive arrow heads prompting the user 3 to move his/her face into the direction of the center of the second circle 34 is also displayed.

All of these graphical elements, i.e. level bar 31, indicator marks 32a, 32b, first circle 33, second circle 34, arrow heads 46, pictorial representation of the user 3, are overlayed on the camera feed, i.e. over the picture captured by the camera 4 and may be used in order to provide visual feedback to the user 3.

The second circle 34 is a fixed circle located substantially in the middle of the screen. The second circle 34 indicates where the user 3 should have his/her face.

Whenever the user's face is at least partly outside the second circle 34, the first circle 33 is displayed. The first circle 33 is displayed as a translucent circle or dot which is overlayed on the face of the user 3. The second circle 33 follows the user's face if the user 3 moves relative to the camera 4.

The directional arrows 46 point from the detected face position towards the center of the second circle 34. The arrows 46 shall prompt the user 3 to alter the relative position between his/her face and the device 1, or the camera 4 respectively. As mentioned above, the user 3 may alter his position in order to move his face into the alignment circle 34 while the device 1 itself is not moved. Additionally or alternatively, the position of the device 1 may be altered such that the user's face appears within the alignment circle 34.

FIG. 5B shows another screen that may be displayed on the display 6. In comparison to FIG. 5A, the relative position between the device 1 and the user 3 is altered. In particular, the position of the user's face has moved from former right (FIG. 5A) to the left side of the second circle 34. The translucent first circle 33 follows the movement of the user's face. Again, the arrow heads 46 point into the direction of the center of the second circle 34.

As further depicted in FIG. 5B, the level bar 31 is located underneath the lower indicator mark 32b and the level bar 31 is also tilted to the left. This indicates to the user 3 that the device 1 comprises a pitch angle that is outside the predetermined angle range, and that the device 1 further comprises a roll angle that is also outside the predetermined angle range. As mentioned above, the predetermined angle range is represented by the region between the upper and the lower indicator marks 32a, 32b.

Stated differently, the level bar 31 measures the phone's roll and pitch so that it can be properly vertical and facing towards the user 3. The level bar 31 should act as a level and move up and down as the pitch changes (e.g. as the device 1 is tilted backwards the level bar 31 would be lower as shown here). The level bar 31 should also tilt diagonally if the phone is rolled and no longer perpendicular to the floor (e.g. it should always remain parallel to the floor regardless of the phone's orientation). The indicator marks 32a, 32b are fixed guides. The level bar 31 must be aligned between these two guides 32a, 32b.

FIG. 5C depicts a further example of a screen that may be displayed on the display 6. The level bar 31 is now located between the upper and lower indicator marks 32a, 32b. Accordingly, this indicates towards the user 3 that the device 1 comprises a roll angle and a pitch angle which lie inside the predetermined angle range. For further visual indication of meeting the predetermined angle range, the level bar 31 may change its color or contrast. As shown, the level bar 31 may change its appearance from a light contrast to a darker contrast.

Furthermore, in comparison to FIG. 5B, the user 3 has moved his face more towards the inside of the second circle 34. As can be seen in FIG. 5C, the user's face is to a certain or critical extent located inside the second circle 34. Accordingly, alignment guides 50 are displayed inside the second circle 34. In particular, a first horizontal alignment guide 51, a second horizontal alignment guide 52 and a vertical alignment guide 53 are displayed.

In other words, if the analyzer 9 analyzes that the detected body portion (i.e. the user's face in this example) is located to a predetermined extent within the predetermined region of the picture (i.e. within the second circle 34), then the analyzer 9 is configured to display alignment guides 51, 52, 53, preferably a first horizontal alignment guide 51, a second horizontal alignment guide 52 and a vertical alignment guide 53, on the display 6.

The magnitude of the aforementioned 'predetermined extent' will be explained in more detail further below with respect to FIGS. 9A to 9D.

The alignment guides 51, 52, 53 shall help the user 3 in aligning his face correctly inside the second circle 34. In particular, the user 3 shall be prompted to align his/her eye region with the first horizontal alignment guide 51, to align his/her mouth region with the second horizontal alignment guide 52, and to align the vertical center region of his/her face, e.g. the bridge of his/her nose, with the vertical alignment guide 53.

Stated differently, when the user's face is in the alignment circle 34, alignment guides 51, 52, 53 for the eyes, nose and mouth may be displayed on the display 6.

FIG. 5D shows a further example of a screen that may be displayed on the display 6 if the user 3 has aligned his face with the alignment guides 51, 52, 53, as mentioned above. As can be seen, the user's eye region is substantially aligned with the first horizontal alignment guide 51, the user's, mouth region is substantially aligned with the second horizontal alignment guide 52, and the user's nose bridge is substantially aligned with the vertical alignment guide 53.

In other words, the analyzer 9 is configured to analyze the relative position between the user 3 and the device 1 (or the camera 4, respectively) such that the detected body portion is aligned with an alignment guide 50 displayed on the display 6.

As can be seen, if the detected body portion, i.e. the user's face in this example, is aligned with the alignment guides 50, then the second circle 34 may change its appearance, e.g. by switching to a different color or contrast. In this example, the second circle 34 may switch to a darker contrast.

Furthermore, when the user's face is aligned with the alignment guides 50 and when the level bar 31 is located within the indicator marks 32a, 32b, a softkey button 54 may be displayed. By clicking said softkey button 54, the screen may switch to a different state, such as shown in FIG. 5E for example.

Stated differently, the alignment circle 34 and the level 31 may change color to indicate correct alignment. The continue button 54 should become enabled once the user's face and the phone 1 are aligned correctly. The user 3 may tap the button 54 to go to a position detection or brushing challenge timer (FIG. 5E), for example.

As can be seen in FIGS. 5A to 5D, two further softkey buttons 55, 56 may be displayed during all of the above described states. The softkey button 55 may be tapped by the user 3 to open first time mounting instructions. The softkey button 56 may be tapped by the user 3 to close the calibration camera and return to a position detection or brushing challenge timer (FIG. 5E), whichever the user 3 had come here from.

FIG. 5E shows a further example of a screen that may be displayed on the display 6. After calibration, which has been described with reference to FIGS. 5A to 5D above, has been completed a Position Detection Insight Overlay 57 may be displayed over the pacer which is calibrated and ready to begin.

FIGS. 5A to 5D showed an example how a relative position between the device 1 and the user 3 along a plane that is substantially perpendicular to the orientation of the camera 4 may be determined. Particularly, FIGS. 5A to 5D may describe an example how the analyzer 9 is configured to determine, based on at least the picture data and optionally the sensor data (respective angles of the device 1), a relative orientation of the device 1 relative to the detected body portion of the user 3, wherein said relative orientation is a relative position between the detected body portion and the device 1 along a plane that is substantially perpendicular to the orientation of the camera 4. In other words, said plane that is substantially perpendicular to the orientation of the camera 4 may be the plane in which the user 3 may move left, right, up and down in front of the camera 4 without varying the distance to the camera 4, i.e. such as depicted in FIGS. 5A to 5D.

FIGS. 6A to 6E show an example how a relative distance between the device 1 and the user 3 may be determined. Particularly, FIGS. 6A to 6E may describe an example how the analyzer 9 is configured to determine, based on at least the picture data and optionally the sensor data (respective angles of the device 1), a relative orientation of the device 1 relative to the detected body portion of the user 3, wherein said relative orientation is a relative distance between the detected body portion and the device 1. A variation in the relative distance may be accomplished when the user 3 moves forward or backward relative to the device 1 or the camera 4, respectively. Accordingly, the pictorial representation of the user 3, i.e. the picture of the user 3 captured by the camera 4, may become smaller or larger on the display 6, depending on whether the user 3 moves away from or towards the camera 4.

Figure 6E:
FIGS. 6A-6E show examples of a screen that may be displayed on a display when a user may alter his/her distance relative to the device.
Figure 6D:
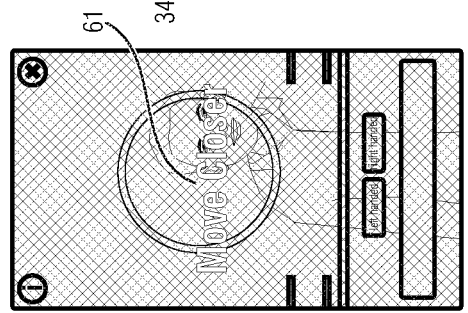
Figure 6C:
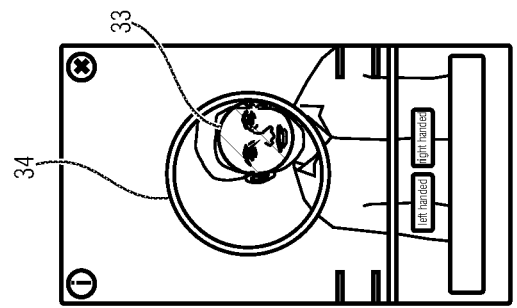
Figure 6B:
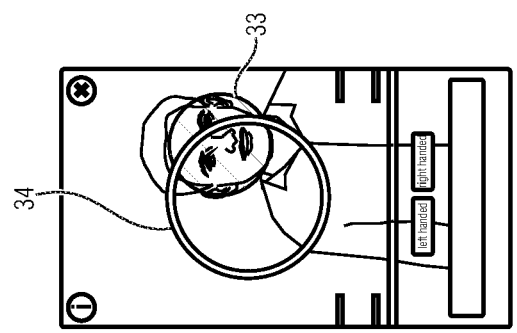
Figure 6A:
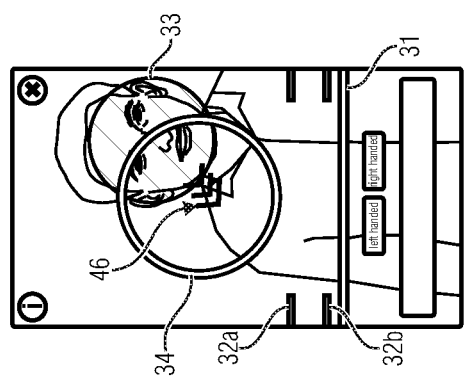

FIG. 6A shows an example of a screen that may be displayed on the display 6. The screen substantially corresponds to the screen depicted in FIG. 5A, i.e. the screen shows the level bar 31, the indicator marks 32a, 32b, the first circle 31 overlayed over the user's face, the second circle 34 and the arrow heads 46 pointing into the direction of the center of the second circle 34, in order to provide visual feedback to the user 3. As can be seen, the outer diameter of the first circle 33 may comprise substantially the same, or at least similar, dimensions as the inner diameter of the second circle 34. This may indicate towards the user 3 that the relative distance between his/her face and the device 1 (or the camera 4, respectively) may be correct such that the analyzer 9 may be enabled to analyze whether the user's face is within the predetermined region of the picture, i.e. within the second circle 34. As mentioned above, when the user's face is out of alignment, arrows 46 should point his/her face back to the correct position.

FIG. 6B shows a situation in which the user 3 has moved further away from the device 1 or the camera 4, compared to the situation depicted in FIG. 6A. As can be seen in FIG. 6B, the face detection still detects the face of the user 3 and overlays the first circle 33. However, as the user 3 moves away from the camera 4, the pictorial representation 5 of the detected face of the user 3 becomes smaller. Accordingly, also the outer diameter of the first circle 33 becomes smaller.

Stated differently, as the user 3 gets farther from the camera 4 the dot 33 tracking his/her face should get smaller. If the user's face gets too far away, the alignment arrows 46 should not be displayed anymore.

FIG. 6C shows a situation in which the user 3 has moved still further away from the device 1 or the camera 4, compared to the situation depicted in FIG. 6B. As can be seen in FIG. 6C, the face detection still detects the face of the user 3 and overlays the first circle 33. However, as the user 3 moves still further away from the camera 4, the pictorial representation 5 of the detected face of the user 3 becomes even smaller. Accordingly, also the outer diameter of the first circle 33 still becomes smaller.

Stated differently, if the user's face is inside the second circle 34, the face tracking dot 33 should appear if the user 3 is a sufficient distance away to warrant warning him/her to get closer for alignment. For details as to when to trigger this tracking dot 33 while the user's face is still in the second circle 34, it is referred to FIG. 11.

At a certain point, i.e. upon detection of a certain minimum size of the first circle 33, a screen such as shown in FIG. 6D may be displayed on the display 6. A message 61 and/or an image may be displayed on the display 6 prompting the user 3 to move closer to the camera 4.

Stated differently, if the user 3 gets far enough away that the device 1 may soon not be able to track him/her anymore, a full screen error message 61 may be displayed on the display 6 prompting the user 3 to move closer.

FIG. 6E shows an example of a screen that may be displayed on the display 6 if the user 3 is too close to the camera 4. With respect to what have been said above, the pictorial representation of the user 3 may become larger within the picture captured by the camera 4, the closer the user 3 moves towards the camera 4. The same applies for the outer diameter of the first circle 33.

At a certain point, i.e. upon detection of a certain maximum size of the first circle 33, a screen (not shown) may be displayed on the display 6. A message 61 and/or an image may be displayed on the display 6 prompting the user 3 to move further away from the camera 4.

Stated differently, as the user 3 gets closer to the camera 4, the dot 33 tracking his/her face should get bigger. If the user's face gets too close, the alignment arrows 46 should not be displayed.

FIGS. 7A to 7E show a further example of screens that may be displayed on the display 6 during use of the device 1. These screens show a Position Detection and Brushing Challenge Timer that may be displayed during use of a personal care device such as a toothbrush.

In the example shown in FIGS. 7A to 7E, the second circle 34 is displayed. Around the second circle 34, six segments 71, 72, 73, 74, 75, 76 are arranged in this example. The upper three segments 71, 72, 73 may represent the upper set of teeth of the user, while the lower three segments 74, 75, 76 may represent the lower set of teeth of the user. In particular, the upper middle segment 72 may represent the upper front part of the user's teeth. The upper left segment 71 may represent the upper left part of the user's teeth, and so on.

The screen shown in FIG. 7A may be displayed after the device 1 has determined the position of the respective body portion of the user 3, such as described above with reference to FIGS. 5A to 5E. In particular, the screen shown in FIG. 7A may correspond to the state of the screen shown in FIG. 5E.

FIG. 7B shows an example of a screen that may be displayed on the display 6 when the detected body portion moves outside the predetermined region of the picture captured by the camera 4. If the user's head moves out of position during a brushing session, a corresponding visual feedback may be provided to the user 3 in that his/her face should be displayed in a circle 31 and arrows 46 should direct him/her back to the center of the second circle 34.

As mentioned before with reference to FIGS. 6A to 6D, it may be possible that the user 3 may move away from the camera 4 during a brushing session. This case is shown in FIG. 7C in which a message 61 and/or an image may be displayed on the display 6 prompting the user 3 to move closer to the camera 4, or to the device 1 respectively. As shown in FIG. 7C, a respective full-screen message is displayed on the display 6.

As mentioned before with reference to FIG. 6E, it may also be possible that the user 3 may move too far towards the camera 4 during a brushing session. This case is shown in FIG. 7D in which a message 77 and/or an image may be displayed on the display 6 prompting the user 3 to move back, i.e. away from the camera 4, or the device 1 respectively. As shown in FIG. 7D, a respective message 77 is displayed on the display 6. Alternatively, a respective full-screen message may be displayed on the display 6.

FIG. 7E shows an example of a screen that may be displayed on the display 6 when the user's face is not detectable, e.g. when the user is not within the focus of the camera 4. This case is shown in FIG. 7E in which a message 78 and/or an image may be displayed on the display 6 informing the user 3 that his/her face is not detectable anymore. As shown in FIG. 7E, a respective message 78 is displayed on the display 6. Alternatively, a respective full-screen message may be displayed on the display 6.

Stated differently, whenever the head is out of range and a face cannot be detected at all, the timer 79 as depicted in FIG. 7E may be displayed in such a way that it is clear that position is not currently being tracked because the user 3 is out of range. Also, the shown message 78 may be displayed. The timer 79 should continue counting up as long as the toothbrush is on. Once the face is detected again, another message and/or image may be displayed for at least two seconds. Said message may contain information, such as "Oops, we couldn't see your face. Always face forward to get the most accurate results".

Figure 8:
FIG. 8 shows an example of fading a detected body portion of the user in when displaying a pictorial representation of said detected body portion on a display.

If the user's face may be displayed on the display 6, such as previously discussed by way of example with reference to FIGS. 7B and 7D, the user's face may be gradually faded in on the screen in order to avoid flickering. Such a gradually fading of the user's face is exemplarily shown in FIG. 8 and is applicable for every detected body portion.

Reference is now made to FIGS. 9A to 9D and FIGS. 10A to 10E which depict examples of screens that may be displayed on the display 6. With reference to said Figures it shall be explained under which circumstances certain screens will be triggered.

FIG. 10A shows an example of a face detection model, wherein the user's head 2 is within a tolerance zone. An inner circle 1010 and an outer circle 1011 may be provided in the model, wherein both circles 1010, 1011 may not be displayed on the display 6. A first rectangle 1012 may be circumscribed around the inner circle 1010. The inner region of the first rectangle 1012 may represent a tolerance zone. As long as the analyzer 9 analyzes that the user's face 2 is within said tolerance zone 1012, the user's face 2 may be considered as being inside the predetermined region of the picture captured by the camera 4. Accordingly, the screen displayed on the display 6 only shows the timer 79, as depicted in FIG. 9A.

FIG. 10B shows an example of the face detection model when the user's head 2 moves out of the tolerance zone, i.e. out of the previously described first rectangle 1012. A second rectangle 1013, which may not be displayed on the display 6, may be circumscribed around the outer circle 34. The inner region of the second rectangle 1013 may represent a transition zone. As long as the analyzer 9 analyzes that the user's face 2 is inside said transition zone 1013, the user's face 2 may be considered as being partly inside the predetermined region of the picture captured by the camera 4. If the analyzer 9 analyzes that the user's face 2 is inside said transition zone 1013 for more than three seconds, the screen displayed on the display 6 may show the user's face inside the first circle 33 in addition to the timer 79, as depicted in FIG. 9B, in order to provide corresponding visual feedback to the user 3. The screen may also show the above discussed arrows 46 pointing into the direction of the center of the second circle 34 and optionally a message 77 and/or an image prompting the user 3 to move back to the center of the second circle 34.

FIG. 10C shows an example of the face detection model when the user's head 2 moves out of the transition zone, i.e. out of the previously described second rectangle 1013. A third rectangle 1014, which may not be displayed on the display 6, may be arranged outside the second rectangle 1013. The inner region of the third rectangle 1014 may represent an error zone. As long as the analyzer 9 analyzes that the user's face 2 is inside said error zone 1014, the user's face 2 may be considered as being outside the predetermined region of the picture captured by the camera 4. As soon as the analyzer 9 analyzes that the user's face 2 is inside said error zone 1014, the screen displayed on the display 6 may immediately show the user's face inside the first circle 33 in addition to the timer 79, as depicted in FIG. 9C. The screen may also show the above discussed arrows 46 pointing into the direction of the center of the second circle 34 and optionally a message 77 and/or an image prompting the user 3 to move back to the center of the second circle 34.

FIG. 10D shows an example of the face detection model when the user's head 2 moves out of the error zone, i.e. out of the previously described third rectangle 1014. The outer region of the third rectangle 1014 may also represent an error zone. As long as the analyzer 9 analyzes that the user's face 2 is outside the third rectangle 1014, the user's face 2 may be considered as being outside the predetermined region of the picture captured by the camera 4. As soon as the analyzer 9 analyzes that the user's face 2 is outside the third rectangle 1014, the screen displayed on the display 6 may immediately show a message 78 and/or an image in addition to the timer 79, as depicted in FIG. 9D. The message and/or image 78 may inform the user that his face is not detectable.

FIG. 10E shows an example according to which the user 3 has turned his head 2 in a first or a second direction. If the user 3 turns his head 2 in one of the directions 1015, 1016 so far that the user's face 2 is not detectable, the same screen as shown in FIG. 9D may be displayed on the display 6. The screen of FIG. 9D may be displayed, for instance, when the user's face is not detectable for at least three seconds.

Figure 11:
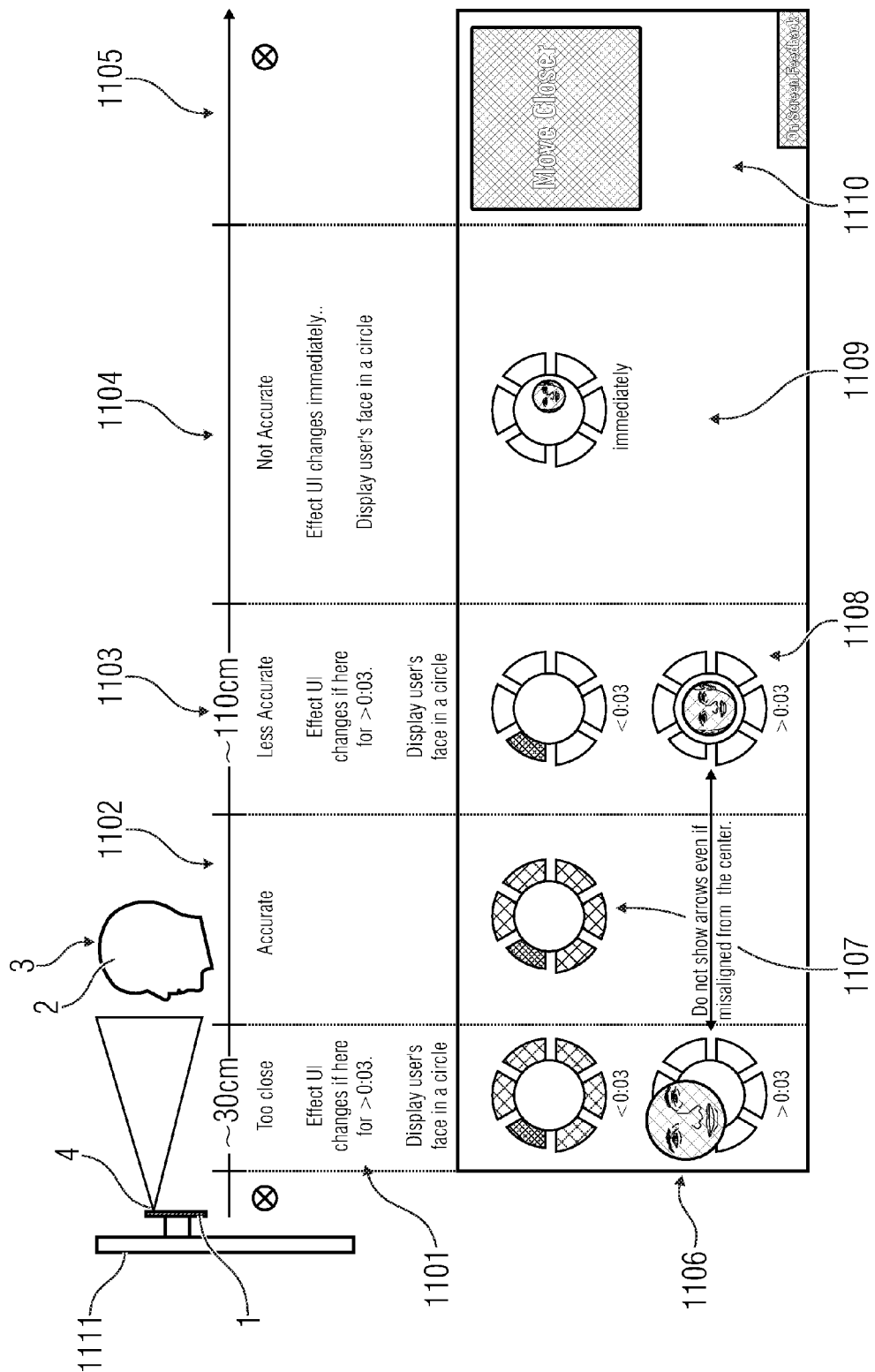
FIG. 11 shows some exemplary screens that may be displayed on a display depending on a relative distance between the user and the device.

FIG. 11 shows examples of screens that may be displayed on the display 6 depending on the relative distance between the user 3 and the device 1, or the camera 4 respectively. The device 1 may, for instance, be mounted on a bathroom mirror 1111.

A first distance region 1101 is a distance region that is between 0 cm and about 30 cm away from the camera 4. This distance is too close for properly detecting the user's face. If the analyzer 9 analyzes that the user's face is within said first distance region 1101 for a predetermined time, e.g. for more than three seconds, a screen 1106 may be displayed on the display 6. This screen may correspond to the screen that has been previously discussed with reference to FIG. 7D.

A second distance region 1102 is a distance region that is between about 30 cm and about 90 cm away from the camera 4. This distance is accurate for properly detecting the user's face. If the analyzer 9 analyzes that the user's face is within said second distance region 1102, a screen 1107 may be displayed on the display 6. This screen may correspond to the screen that has been previously discussed with reference to FIG. 7A.

A third distance region 1103 is a distance region that is between about 90 cm and about 110 cm away from the camera 4. This distance is too far away for properly detecting the user's face. If the analyzer 9 analyzes that the user's face is within said third distance region 1103 for a predetermined time, e.g. for more than three seconds, a screen

1108 may be displayed on the display 6. This screen may correspond to the screen that has been previously discussed with reference to FIG. 6B.

A fourth distance region 1104 is a distance region that is between about 110 cm and about 140 cm away from the camera 4. This distance is too far away for accurately detecting the user's face. If the analyzer 9 analyzes that the user's face is within said fourth distance region 1104 a screen 1109 may be immediately displayed on the display 6. This screen may correspond to the screen that has been previously discussed with reference to FIG. 6C.

A fifth distance region 1105 is a distance region that is more than about 140 cm away from the camera 4. This distance is too far away for properly detecting the user's face. If the analyzer 9 analyzes that the user's face is within said fifth distance region 1105 a screen 1110 may be immediately displayed on the display 6. This screen may correspond to the screen that has been previously discussed with reference to FIG. 6D.

If the user's head or face cannot be detected for more than 30 seconds, for example, then this session will count as a normal brushing session instead of Position Detection. A screen such as depicted in FIG. 12A may be displayed on the display 6. None of the position detection data will be recorded for this session.

A corresponding message 78 and/or image may be displayed for 10 seconds, for example, and will then automatically be dismissed. The user may also dismiss it via the exit button 56 in the top-right. A screen only showing the brush timer 79 may be displayed on the display 6, as shown in FIG. 12B.

After dismissal the device may return to the position detection screen once the user's head is detected again. When the session is finished, a regular Session Summary screen, as shown in FIG. 12C, may be displayed on the display 6 followed by a popup 1201 explaining the error. This shall be explained in more detail with reference to FIGS. 13A to 13G.

Figures 13A, 13B, 13C, 13D:
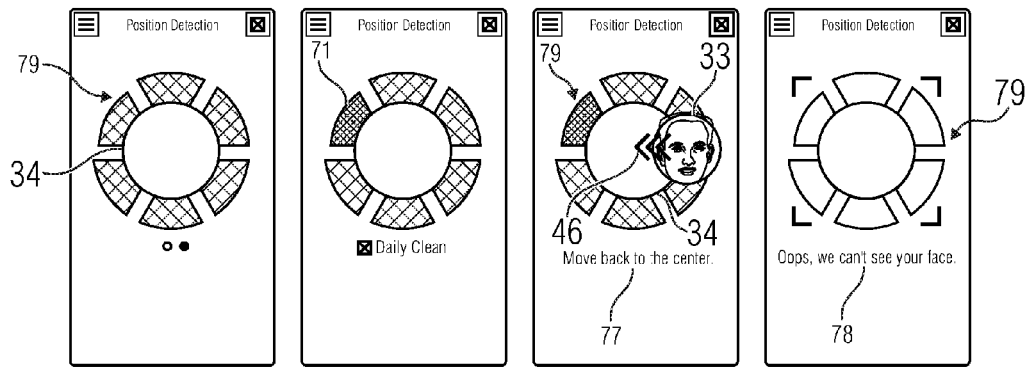
FIGS. 13A-13G show examples of a screen that may be displayed on a display when a user's body portion is not detectable during an exemplary brushing session.

FIG. 13A depicts an example of a screen that may be displayed on the display 6 when the user 3 turns the toothbrush on to begin. The brush timer 79 is displayed and the second circle 34 is displayed in a certain color or shading in order to inform the user that his/her face has been properly detected.

FIG. 13B depicts an example of a screen that may be displayed during a brushing session. The upper left segment 71 is highlighted in order to inform the user 3 that his upper left teeth section shall be brushed.

FIG. 13C depicts an example of a screen that may be displayed on the display 6 when the analyzer 9 analyzes that the user 3 moves out of the transition zone 1013 that has been previously discussed with reference to FIG. 10B. The brush timer 79 is displayed together with the user's face inside the first circle 33, the second circle 34, the arrows 46 pointing into the direction of the center of the second circle 34, and an optional message 77 prompting the user 3 to move back to the center. All of these graphical elements may be displayed on the display 6 in order to provide visual feedback to the user 3.

FIG. 13D depicts an example of a screen that may be displayed on the display 6 when the user's face is no longer within a range to be detected. The brushing timer 79 may be displayed in a lighter color or shading and an optional message 78 may be displayed informing the user that his/her face is not detectable.

Figures 13E, 13F, 13G:
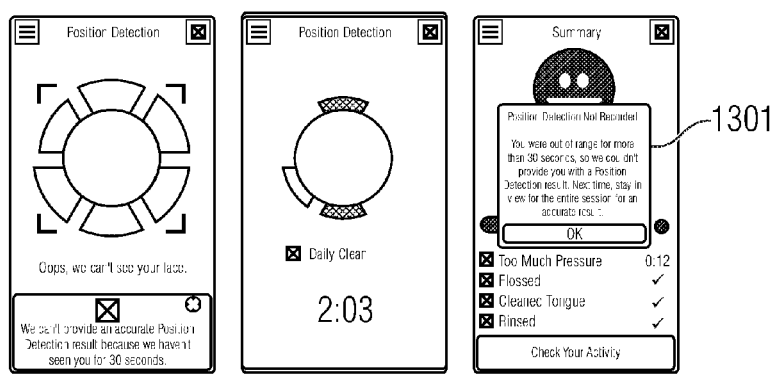
Figure 14:
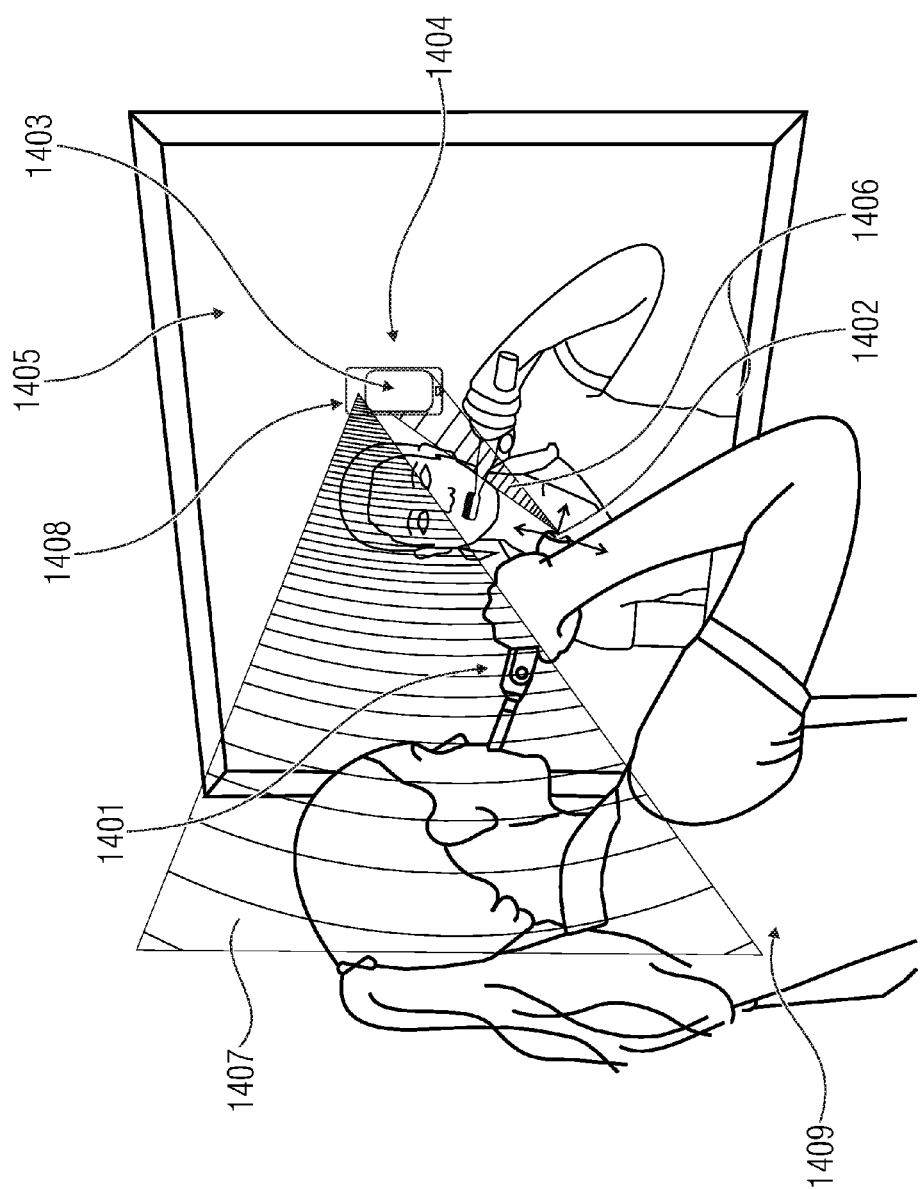
FIG. 14 shows an example of a conventional system being configured to communicate with a toothbrush.

FIG. 13E depicts an example of a screen that may be displayed on the display 6 when the user's face could not be detected over a certain time, e.g. for more than 30 seconds. The brushing timer 79 may be displayed in a lighter color or shading and an optional error message 78 may be displayed informing the user that his/her face is not detectable. Furthermore, a popup 1201 explaining the error to the user may also be displayed on the display 6. Preferably, the error message 78 and the error popup 1201 may be displayed for a certain time, e.g. for ten seconds.

FIG. 13F depicts an example of a screen that may be displayed on the display 6 when the user's face may not be detectable but the user continues brushing. The screen as depicted in FIG. 13F may be displayed on the display 6 in order to present the user the current status of the current brushing session.

FIG. 13G depicts an example of a screen that may be displayed on the display 6 when the user's face was not detectable for too long. The screen as depicted in FIG. 13G may be displayed on the display 6 in order to provide a summary of the current brushing session. Stated differently, a regular summary screen may be displayed on the display 6 since the current brushing session will not record position data due to the user 3 being out of range for too long. An error message 1301 may be displayed on the summary screen as depicted in FIG. 13G.

Summarizing the invention in other words, the invention may be an interactive system setup process that guides users through the installation of a brushing position determination system. The system may take into account sensor data from a smartphone 1 to continuously measure the orientation of the phone 1 during the setup and provides corresponding feedback to the user 3 in order to enable him/her to install everything correctly.

The same applies for the position of the user's face which is required to always being visible for the smartphone's front camera 4. If he starts leaving the focus, he will be warned to not leave the focus and finally gets a message that the system cannot work anymore if he leaves the focus. Additionally he needs to stay in a certain distance of the camera 4. The system guides the user through the setup and checks face position and smartphone position continuously during the usage of the brushing application.

To enable the consumer for cooperation, the smartphone application instructs/guides/educates the consumer to set the whole system up correctly. While guiding the consumer to follow the instructions, the system simultaneously checks the proper installation.

The system can detect when the consumer has completed the tasks. Appropriate feedback is provided. Completed setup tasks trigger the system to start working and providing the actual feedback during brushing. If the consumer changes the adjustment during usage, the system will detect this and provide corresponding instructions or actions.

For the system to work as desired it is advantageous when the following criteria are fulfilled:

Consumer may stand in an upright position, gazing straight ahead into the front camera 4

The smartphone 1 may be affixed to a vertical wall with the front camera 4 at the height level of the consumers nose level Roll of the phone should ideally be 0°, but may have a tolerance of e.g. +/−3°, depending on the sensitivity of the video processing algorithm.

Pitch of the phone should ideally be 0°, but may have a tolerance of e.g. +/−3°, depending on the sensitivity of the video processing algorithm.

Distance between consumer's face and front camera 4 depends on the lens of the camera 4, but should end up in the face covering approximately 75% of the camera's sensor area (Advantageous: complete consumer's face, especially mouth area including parts of the brush body and consumer's hand may always be visible for the camera 4)

Bluetooth connection between power brush and smartphone shall be established

Lighting conditions shall illuminate the face above a certain level. Too light or too dark rooms may affect the result negatively.

Smartphone App shall be executed

The process described below can, for instance, be used for setting the system up before using it, but can also serve as a feedback system during the usage of the brushing app. If the smartphone's position or orientation would be changed during the usage of the system, all data gathered by the at least one sensor would be bad, so an appropriate feedback during usage is required. The sensitivity of the sensor measurement (e.g. roll and pitch of the phone, face distance, face position) can be different during usage of the brushing app from the sensitivity during set up.

Roll, Pitch, Yaw of the Smartphone and Head Position Measurements

This is the definition of what the smartphone measures with its at least one sensor, e.g. with built-in inertial sensors, during the setup and usage of the system. The head/face alignment is measured by the front camera 4 of the smartphone 1 and may use the Fraunhofer SHORE face detection algorithm to determine the position of the face within the camera focus.

All measurements may have an ideal value range, a tolerance value range and an out of range value range. As long as the required face position/smartphone orientation is in the ideal value range, the system indicates that the next step can be taken, e.g. starting the brushing application. If a value is in the tolerance value range, the user is prompted to correct the orientation of the phone/position of the face/distance to the camera. If the values are out of range, another message will ask the user to correct the position/orientation and that the system will not work at all.

On-Screen Instructions During Setup

The user may be asked which hand he prefers using for brushing. This may help the algorithm to reduce the variances of the image processing which may increase feedback quality.

On-screen guidance may provide instant feedback of what the consumer needs to do with the smartphone 1 in order to position it correctly. Every movement and orientation change of the phone 1 may be continuously measured and fed back to the user. In this case the Roll and pitch may be measured.

In parallel the system determines a face in the camera focus and provides guidance on how far away the user should stand and whether the phone 1 is mounted at the right height.

If the ambient lighting conditions are too bad for the system to detect the face properly and stable, the system may provide feedback, that the user should turn on the light or close the blinds/disable direct face illumination/background light which blinds the camera.

On-Screen Instruction During Usage

Whenever the head is out of range and a face cannot be detected the DZM timer may be displayed in such a way that it is clear that position is not currently being tracked because the user is out of range. Also, a corresponding message may be shown. The handle of the toothbrush may trigger a vibration every second while the user's face cannot be detected. The timer should continue counting as long as the toothbrush is on. The disabled UI (User Interface) for position, the corrective message, and vibrations should be automatically demised once the user's face is in view again. Once the face is detected again another message may be shown, for example for two seconds, such as a message containing the information: "Oops, we couldn't see your face. Always face forward to get the most accurate results."

2. If the user's brush position cannot be detected, even if his/her head can be, Position Detection may be disabled, but the timer may continue to count up. The DZM timer may be displayed in such a way that it is clear that position is not currently being tracked because the user is out of range. No message.

3. If the user's head cannot be detected for more than 30 seconds, for instance, then this session will count as a normal brushing session instead of Position Detection. None of the position detection data may be recorded for this session. A corresponding message, such as message 1201 shown in FIG. 12C for example, may be displayed for ten seconds, for example, and then be automatically dismissed. The user may also dismiss it via the exit button 56 in the top-right. After dismissal the system may return to the position detection UI once the user's head is detected again. When the session is finished, show the regular Session Summary screen followed by a popup explaining the error.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A device (1) for determining a position of a body portion (2) of a user (3), the device (1) comprising:
    a camera (4) configured to capture the body portion (2) of the user (3) to obtain a pictorial representation (5) of the body portion (2) of the user (3),
    a display (6) for providing visual feedback to the user (3), wherein the visual feedback comprises information on whether a relative position between the body portion of the user and the device needs to be adjusted, whereby a correct positioning of the camera relative to the body portion of the user can be achieved by analyzing whether the body portion of the user is indeed in the line of sight of the camera, wherein if the correct positioning of the camera relative to body portion of the user is not achieved, respective feedback is provided so that the correct relative positioning of the body portion of the user and the camera can be properly set, including at least one of a roll angle, a pitch angle, and a yaw angle of the camera,
    at least one sensor (7) for determining sensor data comprising the at least one of a roll angle, a pitch angle, and a yaw angle, wherein the at least one sensor is configured to display the at least one of roll angle, pitch angle, and yaw angle of the device (1) on the display (6), thereby enabling the visual feedback and facilitating the correct positioning of the camera relative to the body portion of the user,
    an interface (8) for receiving picture data comprising the pictorial representation (5) of the body portion (2) captured by the camera (4) and for receiving the sensor data, and
    an analyzer (9) for analyzing, based on the picture data, whether the captured body portion (2) is within a predetermined region (34) of the picture captured by the camera (4), and to analyze, based on the sensor data, whether the at least one of roll angle, pitch angle, and yaw angle is within a predetermined angle range.

2. The device according to claim 1, wherein the analyzer (9) comprises a body portion detection algorithm to determine the position of the body portion (2) within the focus (10) of the camera (4).

3. The device according to claim 1, wherein the body portion (2) of the user (3) is the face of the user (3), and wherein the analyzer (9) comprises a face detection algorithm to determine the position of the face (2) within the focus (10) of the camera (4).

4. The device according to claim 2, wherein the analyzer (9) is configured to determine, based on at least the picture data and the sensor data, a relative orientation of the device (1) relative to the detected body portion (2) of the user (3), wherein said relative orientation is a relative distance between the detected body portion (2) and the device (1) and/or a relative position between the detected body portion (2) and the device (1) along a plane that is substantially perpendicular to the orientation of the camera (4).

5. The device according to claim 4, wherein the analyzer (9) is configured to overlay the pictorial representation (5) of the body portion (2) with the predetermined region (34) of the picture and, if the analyzer (9) analyzes that the body portion (2) is at least partly outside the predetermined region (34) of the picture, the device (1) is configured to display a message (77) and/or an image (46) on the display (6) in order to prompt the user (3) to alter the relative orientation between the body portion (2) and the device (1).

6. The device according to claim 1, wherein the at least one sensor (7) is configured to determine the at least one of a roll angle, a pitch angle and a yaw angle of the device (1) and to display the determined roll angle and/or pitch angle and/or yaw angle of the device (1) on the display (6).

7. The device according to claim 6, wherein, if the at least one sensor (7) determines that the roll angle and/or the pitch angle and/or the yaw angle lies outside the predetermined angle range, the device (1) is configured to display an image (31, 32*a*, 32*b*) and/or a message (42) on the display (6) prompting the user (3) to position the device (1) such that it comprises a roll angle and/or a pitch angle and/or a yaw angle that lies within said predetermined angle range.

8. The device according to claim 7, wherein the predetermined angle range of the roll angle and/or the pitch angle and/or the yaw angle lies between +3° and −3°.

9. The device according to claim 1, wherein the predetermined region (34) of the picture covers about 60% to 80%, and preferably 75% of the focus (10) of the camera (4).

10. The device according to claim 1, further comprising a communication interface that is configured to communicate with a personal care device in order to receive information from said personal care device.

11. A method for determining a correct position of a body portion (2) of a user (3) relative to a device structured and configured to capture a pictorial representation of the body portion of the user, the method comprising capturing the body portion (2) of the user (3) by the device in order to obtain a pictorial representation (5) of the body portion (2) of the user (3), providing visual feedback to the user (3)), wherein the visual feedback comprises information on whether a position of the body part of the user relative to the device needs to be adjusted, receiving angle data corresponding to at least one of a roll angle, a pitch angle, and a yaw angle of the device (1, 4) which has captured the pictorial representation (5) of the body part of the user, wherein receiving the angle data comprises displaying the at least one of roll angle, pitch angle, and yaw angle of the device (1) on the display (6), thereby enabling the visual feedback and facilitating the correct positioning of the camera relative to the body portion of the user, receiving picture data comprising the pictorial representation (5) of the body portion (2) of the user, and analyzing, based on the picture data, whether the captured body portion (2) is within a predetermined region (34) of the picture captured by the device (1, 4), and analyzing, based on the angle data, whether the at least one of the roll angle, the pitch angle, and the yaw angle of the device (1, 4) is within a predetermined range and if not, providing feedback to enable the user to set the correct relative positioning between the body portion of the user and the device, including adjusting said at least one of the roll angle, the pitch angle, and the yaw angle, whereby the correct positioning of the device relative to the body portion of the user can be achieved.

12. The method according to claim 11, further comprising detecting the body portion (2) of the user (3) and determining the position of the body portion (2) of the user (3) within the picture captured by the device (1, 4).

13. The method according to claim 11, further comprising determining a relative orientation between the device (1, 4) and the body portion (2) of the user (3), wherein said relative orientation is a relative distance between the body portion (2) of the user (3) and the device (1, 4) and/or a relative position between the body portion (2) of the user (3) and the device (1, 4) along a plane that is substantially parallel to the picture plane of the pictorial representation.

14. The method according to claim 13, further comprising overlaying the pictorial representation (5) of the body portion (2) of the user (3) with the predetermined region (34) of the picture and, if the pictorial representation of the body portion (2) is at least partly outside the predetermined region (34) of the picture, displaying a message (77) and/or an image (46) in order to prompt the user (3) to alter the relative orientation between the body portion (2) and the device (1, 4).

15. A computer program stored on non-transitory medium for performing, when running on a computer, the method according to claim 11.

\* \* \* \* \*